United States Patent
Lowitz et al.

(10) Patent No.: US 11,105,705 B1
(45) Date of Patent: Aug. 31, 2021

(54) NON-INVASIVE, INDEPENDENTLY POWERED LEAK DETECTOR AND VALVE SHUT-OFF APPARATUS

(71) Applicant: LEAKSENTINEL INC., Redwood City, CA (US)

(72) Inventors: Gregory E Lowitz, Redwood City, CA (US); William Loesch, Hillsborough, CA (US); Vidyabhusan Gupta, Palo Alto, CA (US); Adam L Freund, Bozeman, MT (US)

(73) Assignee: LeakSentinel Inc., Redwood City, CA (US)

( * ) Notice: Subject to any disclaimer, the term of this patent is extended or adjusted under 35 U.S.C. 154(b) by 218 days.

(21) Appl. No.: 15/938,679

(22) Filed: Mar. 28, 2018

Related U.S. Application Data

(60) Provisional application No. 62/480,336, filed on Mar. 31, 2017.

(51) Int. Cl.
| | |
|---|---|
| *F16K 31/04* | (2006.01) |
| *G01M 3/28* | (2006.01) |
| *G05D 7/06* | (2006.01) |
| *G01M 3/24* | (2006.01) |
| *F16K 31/05* | (2006.01) |

(52) U.S. Cl.
CPC ........ *G01M 3/2807* (2013.01); *G05D 7/0635* (2013.01); *G05D 7/0641* (2013.01); *F16K 31/046* (2013.01); *F16K 31/047* (2013.01); *F16K 31/05* (2013.01); *G01M 3/243* (2013.01); *G01M 3/2815* (2013.01)

(58) Field of Classification Search
CPC .. G01M 3/2807; G01M 3/243; G01M 3/2815; G05D 7/0635; G05D 7/0641; F16K 31/046; F16K 31/047; F16K 31/05
USPC ...................................... 137/487.5
See application file for complete search history.

(56) References Cited

U.S. PATENT DOCUMENTS

| | | | | |
|---|---|---|---|---|
| 3,580,092 A | * | 5/1971 | Scarpa ..................... | G01F 1/666 73/861.18 |
| 4,374,477 A | * | 2/1983 | Kikuchi .................. | G01F 1/667 310/346 |
| 4,392,380 A | * | 7/1983 | Caines ...................... | B06B 3/00 73/599 |
| 4,454,767 A | * | 6/1984 | Shinkai ................... | G01F 1/662 73/861.18 |
| 4,736,763 A | * | 4/1988 | Britton .................. | D06F 39/081 137/10 |

(Continued)

OTHER PUBLICATIONS

Marketing Material [online; retrieved Jul. 7, 2018] Company Name:Aqua-Stop Company Website: http://www.aqua-stop.com/e-index.html.

(Continued)

*Primary Examiner* — Minh Q Le
(74) *Attorney, Agent, or Firm* — Fish & Richardson P.C.

(57) ABSTRACT

Disclosed herein are inexpensive, easy-to-install (do-it-yourself/DIY), non-invasive, independently powered automated devices, apparatuses, systems and methods for leak detection, prevention and mitigation, particularly fluid leak detection, prevention and mitigation, as well as water leak detection and water-supply shutoff of domestic and commercial pressurized water-supply networks.

33 Claims, 16 Drawing Sheets

(56) References Cited

U.S. PATENT DOCUMENTS

| | | | | | |
|---|---|---|---|---|---|
| 5,038,820 | A | * | 8/1991 | Ames | F16K 31/02 |
| | | | | | 137/460 |
| 5,287,884 | A | * | 2/1994 | Cohen | E03B 7/071 |
| | | | | | 137/486 |
| 5,347,264 | A | * | 9/1994 | Bjorkman | F17D 5/00 |
| | | | | | 340/611 |
| 5,409,037 | A | * | 4/1995 | Wheeler | G01M 3/243 |
| | | | | | 137/487.5 |
| 5,548,530 | A | * | 8/1996 | Baumoel | G01M 3/243 |
| | | | | | 702/48 |
| 5,967,171 | A | * | 10/1999 | Dwyer, Jr. | F16K 31/046 |
| | | | | | 137/78.1 |
| 6,065,735 | A | * | 5/2000 | Clark | F01L 13/0005 |
| | | | | | 251/129.03 |
| 6,237,618 | B1 | * | 5/2001 | Kushner | E03B 7/071 |
| | | | | | 137/1 |
| 6,317,051 | B1 | * | 11/2001 | Cohen | G01M 3/2807 |
| | | | | | 340/603 |
| 6,349,599 | B1 | * | 2/2002 | Lynnworth | G01N 29/223 |
| | | | | | 73/644 |
| 6,662,821 | B2 | * | 12/2003 | Jacobsen | F16K 31/05 |
| | | | | | 137/2 |
| 6,725,878 | B1 | * | 4/2004 | Nawa | G01M 3/243 |
| | | | | | 137/312 |
| 7,204,270 | B2 | * | 4/2007 | Hendrix | E03D 1/00 |
| | | | | | 137/486 |
| 7,274,996 | B2 | * | 9/2007 | Lapinski | G01F 1/666 |
| | | | | | 702/48 |
| 7,963,176 | B2 | * | 6/2011 | Pors | A61B 8/4209 |
| | | | | | 73/861.28 |
| 8,931,755 | B2 | * | 1/2015 | Staffiere | F16K 31/055 |
| | | | | | 251/77 |
| 9,016,662 | B2 | * | 4/2015 | Staffiere | F16K 31/055 |
| | | | | | 251/129.11 |
| 9,207,143 | B2 | * | 12/2015 | Franklin | G01M 3/26 |
| 9,374,024 | B2 | * | 6/2016 | Nguyen | H02N 11/006 |
| 9,664,589 | B2 | * | 5/2017 | Horne | F17D 5/06 |
| 9,759,345 | B2 | * | 9/2017 | Savla | F16K 31/02 |
| 9,759,632 | B2 | * | 9/2017 | Trescott | G01M 3/002 |
| 9,810,599 | B2 | * | 11/2017 | Bright | G01M 3/002 |
| 10,161,115 | B2 | * | 12/2018 | Beger | E03B 7/071 |
| 10,410,501 | B2 | * | 9/2019 | Klicpera | F16K 31/02 |
| 2004/0035190 | A1 | * | 2/2004 | Sinha | G01N 29/036 |
| | | | | | 73/61.49 |
| 2005/0126635 | A1 | * | 6/2005 | Addink | G05D 7/0635 |
| | | | | | 137/487.5 |
| 2006/0124171 | A1 | * | 6/2006 | Ghazarian | F17D 5/06 |
| | | | | | 137/312 |
| 2009/0255345 | A1 | * | 10/2009 | Gysling | G01F 1/662 |
| | | | | | 73/861.25 |
| 2010/0258204 | A1 | * | 10/2010 | Cipolla | E03B 7/071 |
| | | | | | 137/460 |
| 2012/0103069 | A1 | * | 5/2012 | Al-Qahtani | G01M 3/243 |
| | | | | | 73/40.5 A |
| 2012/0180877 | A1 | * | 7/2012 | Lais | G01M 3/002 |
| | | | | | 137/487.5 |
| 2014/0230925 | A1 | * | 8/2014 | Halimi | G05D 16/20 |
| | | | | | 137/487.5 |
| 2015/0348392 | A1 | * | 12/2015 | Burtner | G01F 23/242 |
| | | | | | 340/605 |
| 2017/0307466 | A1 | * | 10/2017 | Brennan, Jr. | G01F 1/66 |
| 2018/0010978 | A1 | * | 1/2018 | Bailey | G01M 3/002 |
| 2018/0230681 | A1 | * | 8/2018 | Poojary | G01F 15/063 |
| 2018/0334786 | A1 | * | 11/2018 | Sharratt | F16K 51/00 |
| 2018/0375680 | A1 | * | 12/2018 | Wright | G01D 4/008 |
| 2019/0136492 | A1 | * | 5/2019 | Trescott | E03B 7/071 |
| 2019/0281371 | A1 | * | 9/2019 | Klicpera | H04Q 9/02 |

OTHER PUBLICATIONS

Marketing Material [online; retrieved Jul. 7, 2018] Company Name: Buoy Labs Company Website: https://www.buoy.ai.

Marketing Material [online; retrieved Jul. 7, 2018] Company Name: Dome Company Website: https://domeha.com/z-wave-water-main-shut-off-valve.

Marketing Material [online; retrieved Jul. 7, 2018] Company Name: ECO NET Controls Company Website: https://www.econetcontrols.com.

Marketing Material [online; retrieved Jul. 7, 2018] Company Name: Eddy Home Company Website: https://eddyhome.com.

Marketing Material [online; retrieved Jul. 7, 2018] Company Name: Flologic Company Website: http://www.flologic.com.

Marketing Material [online; retrieved Jul. 7, 2018] Company Name: Gizmode Innovations Company Website: http://www.thewateralarm.com.

Marketing Material [online; retrieved Jul. 7, 2018] Company Name: Onsite Pro Inc. Company Website: https://www.getfloodstop.com/Default.asp.

Marketing Material [online; retrieved Jul. 7, 2018] Company Name: Flo Technologies Company Website: https://meetflo.com.

Marketing Material [online; retrieved Jul. 7, 2018] Company Name: Fortrezz Company Website: https://www.fortrezz.com/shop/.

Marketing Material [online; retrieved Jul. 7, 2018] Company Name: Elexa Company Website: https://www.getguardian.com.

Marketing Material [online; retrieved Jul. 7, 2018] Company Name: Grohe Company Website: https://shop.grohe.co.uk/smarthome/sense-guard/.

Marketing Material [online; retrieved Jul. 7, 2018] Company Name: H2ALO Company Website: http://h2alo.com.

Marketing Material [online; retrieved Jul. 7, 2018] Company Name: Home Beaver Company Website:http://www.homebeaver.com.

Marketing Material [online; retrieved Jul. 7, 2018] Company Name: HYDROCOM Company Website: http://hydro-com.com/index.php.

Marketing Material [online; retrieved Jul. 7, 2018] Company Name: Sentinel Hydrosolutions Company Website: http://leakdefensesystem.com.

Marketing Material [online; retrieved Jul. 7, 2018] Company Name: Leak Intelligence, LLC Company Website: https://www.leakintel.com.

Marketing Material [online; retrieved Jul. 7, 2018] Company Name: Leak Smart Company Website: https://leaksmart.com.

Marketing Material [online; retrieved Jul. 7, 2018] Company Name: Phyn, LLC Company Website: http://www.phyn.com.

Marketing Material [online; retrieved Jul. 7, 2018] Company Name: Pipe Burst Pro Company Website: http://www.pipeburstpro.com.

Marketing Material [online; retrieved Jul. 7, 2018] Company Name: Triple Plus Company Website: http://www.tripleplus.io.

Marketing Material [online; retrieved Jul. 7, 2018] Company Name: Wally Labs, LLC Company Website: https://www.wallyhome.com.

Marketing Material [online; retrieved Jul. 7, 2018] Company Name: Water Hero, Inc Company Website: https://waterheroinc.com/home/.

Marketing Material [online; retrieved Jul. 7, 2018] Company Name: Dynaquip Controls Company Website: http://www.watercop.com.

* cited by examiner

NON-INVASIVE, INDEPENDENTLY POWERED LEAK DETECTOR AND VALVE SHUT-OFF APPARATUS

CROSS REFERENCE TO RELATED APPLICATIONS

This application claims the benefit of Provisional Application No. 62/480,336, filed Mar. 31, 2017, the disclosure of which is hereby expressly incorporated in its entirety by reference herein.

FIELD OF USE

Embodiments of the present disclosure find applicability in the field of pipe leak detection and mitigation. One useful field includes the field of water pipe leak detection and mitigation.

BACKGROUND

In homes, multi-family dwellings, and other commercial structures, pressurized water-supply lines from municipal water supplies are ubiquitous. Even in buildings that are supplied via individual wells, the water entering the premises is pressurized. Such water-supply systems contain a network of pipes, fittings, and fixtures to deliver water to points-of-use such as appliances, baths, faucets, filtrated drinking water, fire sprinklers, hose bibs, HVAC systems, ice makers, irrigation systems, laundry rooms, showers, spas, swimming pools, and water heaters.

Common pressurized domestic water piping materials include but are not limited to, copper (type M, L, K), PVC (especially for irrigation), CPVC (potable water and fire sprinklers), PEX (cross-linked polyethylene tubing), galvanized steel (GI), and less commonly, stainless steel. Under normal conditions, municipal water systems and well pumps supply pressure between 30 and 120 psi. However, in some towns and cities, municipal water pressure may range between 150 and 300 psi, particularly in hilly and canyon neighborhoods where very high pressure is mandated for fire hydrants due to increased fire hazard in such areas. Excessively high pressure puts domestic and commercial piping systems and appliances at risk for leaks and catastrophic water damage, including frequent damage to inline pressure regulators typically designed to maintain moderate output pressure between 25 and 75 psi.

With aging pipes across millions of households, leaks are commonplace, causing billions of dollars in losses annually. 37% of US homeowners claim to have suffered losses from water damage. Some estimates put the average repair cost at $8,000 to $10,000 or more per event. Causes of leaks may include but are not limited to poor joints, corrosive water, failing pressure regulators, freezing temperatures, rodents, earthquakes, foundation settlement, excessive dynamic pressure and velocity-induced water hammer, faulty workmanship, and manufacturing defects in materials or poor quality control.

Leaks may cause significant damage to flooring, ceilings, walls, structural members, commercial inventory, equipment, and personal belongings. Within 24-48 hours of a leak, toxic mold may begin to form on drywall, wood, and other organic surfaces. Furthermore, leaks also waste precious water resources, which are increasingly limited and rationed to comply with locally mandated water-consumption restrictions. Frequently, accelerated penalties apply to property owners who exceed their monthly water-use targets. The penalties can mount quickly, often far exceeding the average monthly charge for normal use.

Two principal types of devices exist for property owners to detect and mitigate leaks. The most effective of these solutions are inline devices that combine a water flow meter with an electronically controlled water shut-off valve, such as available from FloLogic®. These devices automatically shut off water to the dwelling if a preset minimum water flow rate is continuously detected for a preset minimum time. Installation of such devices generally requires the services of a professional plumber since it is necessary to cut and rejoin the main water pipe entering the structure. However, due to the invasiveness of installing most currently available automatic in-line shutoff valves, which require cutting of pipes and basic plumbing skills, most consumers simply will never do it. Furthermore, installation of these devices may also require an electrician since the devices operate from 120-volt AC power, which is not always available near the point where the water main enters the dwelling. Moreover, in the event of a power outage, which may occur during a catastrophic leak-causing event such as an earthquake, the shutoff valve will not actuate unless a back-up generator or alternative power source is continuously available.

The other commonly available devices for detecting water leaks are wired or wireless floor-mounted resistive sensors that detect the accumulation of water from a leak, such as the Honeywell® Water Defense Leak Sensing Alarm. Such devices are easy to install. However, they are very limited in their ability to protect an entire dwelling; a leak is only detected if a floor-mounted sensor happens to be placed in a location where water is accumulating. Furthermore, such devices are only capable of generating a warning; they generally do not offer the capability to automatically or remotely shut off water to the dwelling to mitigate damage from the leak.

There remains a need for inexpensive, easy-to-install water-leak detectors and water shut-off valve actuators that have their own power source, can be monitored and activated remotely, and are non-invasive.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In one embodiment it is an object of the present disclosure to provide consumers, property owners, and business owners with an inexpensive, battery-operated wireless water-leak detection and mitigation system with automatic or automated water-line shutoff capabilities that a lay person can install and configure in under fifteen minutes using ordinary tools, such as a screwdriver—without cutting into and disabling the existing water-distribution network. The system consists of two connected components: a leak-detection module and a valve-actuator module. In one embodiment, the modules are part of a single, integrated device and the detector comprises means for communicating directly with said actuator including, for example, by direct, including wired, connection. In another embodiment, the modules comprise discrete devices that are externally connected or are otherwise in direct communication.

In another embodiment it is an object of this disclosure to provide an inexpensive, battery-operated wireless water-leak detection device that is non-invasive, easy-to-install, and which can communicate alerts, data and status to users remotely. As used herein, "non-invasive" is understood to mean that the flow detector and actuator devices, components and methods disclosed herein can be associated with the surface of an existing pipe and/or shut-off valve on a pipe, and do not require cutting of existing pipe, or the insertion of additional pipe or pipe couplings to install and utilize.

In still another embodiment it is an object of this disclosure to provide an inexpensive, non-invasive, easy-to-install, battery-operated wireless water-leak mitigation device with automatic and automated water shut-off capabilities, and which can communicate alerts, data and status to users remotely.

In one embodiment an independently-powered water-leak detection device and method of use are provided comprising means for non-invasive pipe attachment; means for sensing and/or measuring water flow in a pipe and changes therein; means for sensing and/or measuring the ambient environment and detecting changes therein;

means for communicating these measurements and measurement changes to a remote user, and means for responding to commands received from a user.

In another embodiment, the independently-powered water-leak detection device is battery-powered. As used herein, "independently powered" means able to source or supply its own power, without being plugged into a standard wall outlet or other grid-tied electricity. Examples of "independently powered" or "self-powered" sources include, without limitation, batteries, solar cells, generators, wind-generated power sources, and other non-grid-tied power sources. "Batteries" include, without limitation, devices comprising one or more electrochemical cells. In another embodiment, the means for measuring water flow in a pipe comprises means for non-invasively measuring the water-flow rate in a pipe. In still another embodiment, the means of non-invasive water flow measurement includes at least one non-invasive sensor including, for example, without limitation, an ultrasonic or acoustic sensor, and/or combinations thereof. Useful non-invasive sensors can include piezo-electric transducers, including, without limitation, piezoelectric ultrasound or acoustic transducers, and/or combinations thereof. In one embodiment, the non-invasive sensor can include an acoustic or audio frequency microphone removably attached to, or otherwise associated with, the surface of a pipe. In yet another embodiment, the means for measuring changes in water-flow rate can occur by taking sampling data from a non-invasive sensor at regular intervals, and providing the data to a data analyzer for comparison to one or more baseline values. In still another embodiment, the communication means occurs electronically, including via wireless service.

In still another embodiment, the ambient-environment measurement means can include ambient-environment sensors including, without limitation, thermometers, humidity detectors, pressure sensors and the like, and means for collecting sampling data at regular intervals and communicating these to a data analyzer.

In yet another embodiment, the independently powered water-leak detection device disclosed herein further comprises the ability to communicate to a valve-actuator device competent to shut off water flow on command. In one embodiment, the actuator may comprise part of the leak detection device. Thus, the water-leak detection device comprises means for instructing a valve-actuator device to shut off water flow. In another embodiment the instruction means are automatically activated when the device identifies an unexpected change in water flow rate. In still another embodiment, the instruction means can occur electronically for devices operating at a distance. In another embodiment, the instruction means can occur by means of a physical connection between the devices, including a data cable connection. Actuator devices competent to receive and respond to such instruction as disclosed herein are said to be "preconfigured".

In another embodiment an independently-powered water valve shut-off device and method of use are provided comprising means for non-invasive pipe attachment; means for receiving instruction to turn off the water valve; and means for mechanically stopping water flow at the device location. Optionally, the device further can comprise means for communicating the valve status to the detection device and/or to a user at a distance.

In another embodiment, the disclosure includes a system for providing automated communication about water flow status through pipes in a building to a remotely located user, and/or for automated shut off of a water valve, including following electronic detection of a change or anticipated change in water flow through a pipe. Such a system can include a communications application and a corresponding communication server. The communication application can run on a mobile device and be configured to, when activated, receive data sampled at regular intervals from a water leak detection device, and/or the analyzed output of such sampled data, and send communications, including pre-configured messages, to a user and/or a set of designated, preconfigured third parties, such as plumbers, electricians, insurance companies and water remediation specialists. The application also is capable of communicating directly to a water valve actuator, which may be located in the detection device or elsewhere, to shut off the water valve, either automatically, or on command by the user or a designated third party.

In another aspect, the disclosure includes a method for providing automated communications about water-flow status through pipes in a building to a remotely located user, and/or for automated shut off of a water valve following electronic detection of a change or anticipated change in water flow through a pipe. Such a method can begin with a communication to the water-leak detection communications application from the water-leak detection device or water-leak data analyzer indicating a detected or anticipated change in water flow through the pipe. This communication can occur through a server. The communication can present in the communications application as a preconfigured message, alert, notification, badge or banner, for example. In response, the application can then interface with a water shut-off valve for automated or manual shut off, and to one or more designated third parties. Additionally, the method also can include subsequent communications with the detection device to monitor the status of the water flow and possible leak, and/or to open the water valve once the leak issue or potential issue has been resolved.

Yet another aspect of the disclosure can include a computer program product that includes a computer readable storage medium having embedded computer usable program code. The computer usable program code can be configured to detect a predetermined activation sequence or mechanism for a communications application, including an emergency communications application, of a water leak or anticipated water leak. In addition, or alternatively, the computer usable program code can be configured to receive and analyze data sampled from a water-detection device sensor, compare the data with one or more baseline water flow values, and communicate that result to a user and/or designated third-party contacts through the communications application. The computer usable program code also can be configured to detect a predetermined activation sequence or mechanism for communicating to a water shut-off valve and change the status of the valve, for example, from on to off. The computer usable program code also can be configured to provide status updates to the user and/or designated third parties. In addition, the computer usable program code also can be configured to detect a predetermined activation sequence or mechanism for receiving communications from a user requesting additional information on the status of an actual or anticipated or potential water leak, and responding to same.

In one preferred embodiment devices disclosed herein have application for residential and light-commercial use. In one embodiment the leak-detection devices or modules disclosed herein can securely mount to pipes ranging in size from ½" to 1¼" or larger using a suitably sized spring clamp that can accommodate a range of pipe diameters.

In another embodiment, an objective of the instant disclosure is to eliminate all external power-supply wires (including AC power or AC-to-DC converters) that would otherwise be required by using a power-efficient design that operates from readily available off-the-shelf batteries that the user may easily replace.

In still another embodiment, another objective is to allow the leak-detection module to be connected to the valve-actuator module. In one mode of operation, the leak-detection module can be programmed with a specified leak "condition" (such as a continuous specified minimum flow rate for specified minimum duration). If a leak condition is detected, a signal can be sent to the valve actuator module to shut off the water.

In one embodiment the leak detection module and the shut-off valve module are not physically connected and communication occurs electronically. In another embodiment, the two modules are physically connected, for example by means of a data cable. In still another embodiment the two modules are contained within a single unit.

A further objective is to connect the leak detection module to the internet through a wireless (Wi-Fi or similar) connection. Such connection can be easily set up using a mobile-phone or smartphone application.

Another objective is to use the connection to the internet to send instantaneous flow-rate information to a cloud-based server at a high sampling rate (every few seconds). Such high time-resolution flow-rate information can be coupled to heuristic algorithms that identify certain types of leaks (e.g., a leaky toilet flapper valve) as well as provide early indication of unusual water use patterns by home appliances (e.g., a dishwasher). Such heuristic algorithms can be continuously improved based on feedback from high time-resolution flow data collected from thousands or millions of system installations thereby minimizing false alarms or missed leaks.

A further objective is to detect a wide range of leaks, from slow drips of one drip or less per second to catastrophic bursts of many liters per minute, and variable conditions in between. Integrated ambient-air and pipe-surface temperature sensors can warn of impending freezing conditions that warrant preventive action. Such preventive actions can include, without limitation, turning off the water supply and draining the pipes of water at risk of freezing.

Still another objective is to disassociate the requirement for a leak-detection module to be associated with a shut-off valve. Even if the leak detector does not also shut off the water, there is still value to receiving a leak alert. Furthermore, it may be desirable to install more than one leak detection module in a single dwelling. For example, it may be desirable to have one leak-detection module to monitor for leaks inside the dwelling and one leak detection module to monitor for outdoor leaks (e.g. irrigation systems, pools, etc.).

Among conditions where automatically shutting off the water may not be desirable, examples include a fire-sprinkler system where a localized fire would cause the sprinkler to actuate at a high flow rate. Shutting off the water would render the system useless in controlling the spread of fire. A second example is when a person is physically on the premises and can visually inspect for a leak prior to shutting off the water. A third example is to troubleshoot and identify the specific appliance or faulty plumbing section responsible for a leak. Yet a fourth example is where the leak detector may measure continuous flow to inform consumers of usage trends and opportunities for conservation.

Still another objective of the instant disclosure is to provide a valve actuator useful in the devices, systems, components and methods disclosed herein that includes a universal valve connection means. In one embodiment, the universal connection means is a mechanical connection means. In another embodiment, the connection means supports a variety of valves, including, without limitation, ball, globe and gate valves. In still another embodiment, the connection means does not require long lengths of straight pipe as is currently typical in the art. In yet another embodiment, the connection means is a direct mechanical connection with the valve mechanism itself. In still another embodiment the actuator is competent to manipulate the handle of a fluid control valve, including a ball, gate or globe valve, in response to a signal or remote communication, moving the handle into an off or on position, as instructed.

In one preferred embodiment, the valve-actuator system provides a battery-operated, automated shutoff-valve actuator module that can attach to a pre-existing ball, gate or globe valve typically found at the point of entry to a home or building. The actuator module can turn the valve off, as well as on again after a repair or false alarm has been verified and resolved. Useful designs can support turn-off and turn-on torques in the range of up to about 5.5-11 Nm (50-100 in-lbs). Other torque values, including higher torque values for larger valves, also are contemplated and can be achieved by standard means well known in the art, including by using larger batteries with more power capacity, a larger motor, and/or a modified actuator gearing ratio, for example.

Another objective of the overall system is to provide users with leak-detection alerts and the ability to remotely and electronically control the valve-actuator module through, for example, a smartphone application. Such smartphone application can also simplify the repair and remediation process in the event of an actual leak. The smartphone application can be capable of simultaneously sending alerts to pre-certified, licensed, and user-selected partners, such as plumbers, water restoration management companies and contractors to assist in cleanup, mold remediation, and repairs. Insertion of context-specific advertising into the smartphone application also is contemplated, as well as rebates or incentives from insurance companies to subsidize the installation of the device.

By separating the leak-detection functionality from the shutoff-valve actuator functionality, it may be possible to enjoy the best of both worlds: low-cost leak detection with the option (but not requirement) to remotely control one or more shutoff valves depending on the consumer's predisposition and availability of funds. Based on the nature of a given water distribution system, an end-to-end network may contain one or more leak detectors and one or more shutoff-valve actuators working together to mitigate water damage to a whole structure or select branches. Alternatively, some consumers may want only the remote shutoff valve or the leak detector, but not both. This disclosure gives the consumer a full choice of options that trade-off cost, risk and convenience.

The instant disclosure addresses the shortcomings of existing solutions through a novel approach that focuses on low cost and ease of installation.

Eliminating the need for professional installation opens the door to more widespread adoption of leak-detection and mitigation solutions. Non-invasive installation has the added benefit that there may be no pressure drop or potential mechanical failure inside a pipe. A logical extension of the instant disclosure is the addition of new kinds of sensors and connectivity to existing home automation. For example, the addition of pressure sensors at strategic points may further improve early detection of frozen pipes. Use of remotely positioned acoustic piezoelectric transducers, MEMS sensors or audio-frequency microphones, for example, may help to isolate leaks to a given branch circuit or room. When combined, such a solution can provide a comprehensive leak-detection solution covering the most complex plumbing systems.

Useful applications and attributes of the instant disclosure include:

- A low-cost, easy-to-install, end-to-end system composed of one or more non-invasive battery-operated, wireless ultrasonic or acoustic leak detectors and one or more non-invasive, battery-operated, wireless shutoff-valve actuators capable of controlling an existing ball, gate or globe shutoff valve. The actuators and leak detectors may be contained within single devices or comprise separate, discrete devices.
- High time-resolution flow detection and data logging with coupled heuristic algorithms for identification of leak type and also for identification of water usage.
- Leak detectors that include a pipe-surface thermal sensor and ambient-temperature sensor to detect conditions for freezing pipes.
- Leak detectors that include a user-configurable spring clamp to accommodate different pipe-sizes from to 1¼" and beyond.
- Flexible architecture encompassing One-to-One (Peer-to-Peer, e.g., one detector to one valve actuator, which may be housed in the same device as the detector or be housed separately), One-to-Many (one leak detector to a plurality of preconfigured shut-off valve actuators), Many-to-One (a plurality of leak detectors to one shut-off valve actuator), or each one in use by itself (e.g. just a leak detector with mobile alarms, or just a wireless shutoff valve with remote control via a mobile phone).
- Ability of multiple sensors to direct a single shutoff valve to "shut off" or "turn on".
- Ability of a single leak detector sensor to control one or more shutoff valves depending on branch configuration.
- Ability to include a remote pressure sensor to detect increasing pressure due to freezing pipes or faulty pressure regulator with alarms/alerts.
- Ability of the shutoff valve to operate on pre-installed ball, globe and gate valves (including accommodation for variable Z-axis height as gate valve is turned) in a front or rear-facing orientation.
- Connectivity of the overall network to the cloud where more extensive signal processing may be performed, including data aggregated across many users, to continually improve the leak-detection algorithms.
- Ability for the leak detector and/or shutoff valve to be integrated into a single device, or embedded within a pressure regulator.
- Ability to automatically alert a certified plumber and/or restoration management company of a leak (in addition to the owner).
- Ability to insert advertising to subsidize subscriptions or provide rebates on insurance plans.
- Pulse-modulating the active measurement period to reduce power requirements, integrating results to assess whether a leak is present; meaning means for modulating or regulating battery activity, including inducing a battery "sleep mode" between sensor samplings in a detection device or module, and/or between signals received by a valve actuator device or module.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
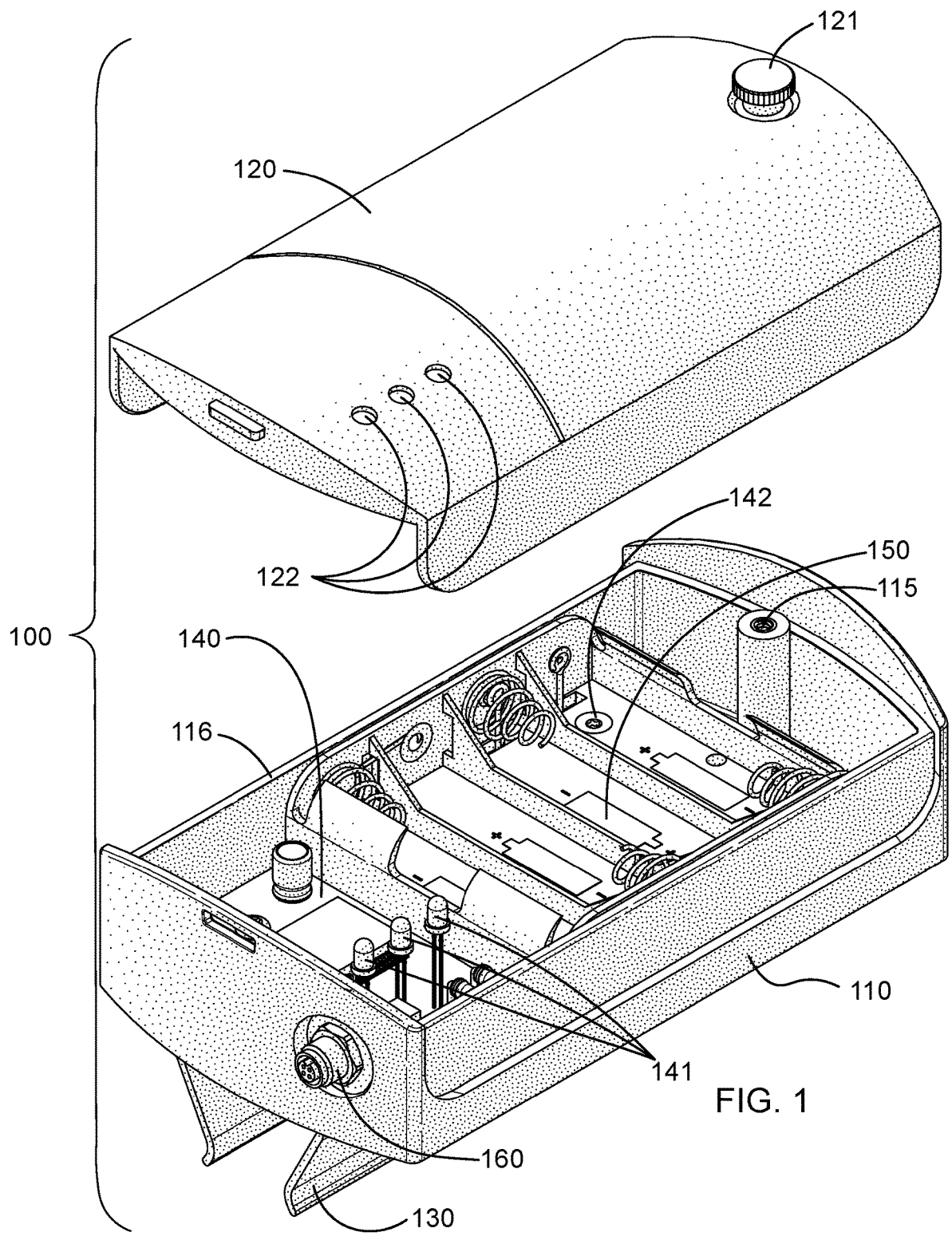
FIG. 1 is a left-top-front isometric view of one embodiment of a non-invasive battery-powered wireless ultrasonic leak detector with battery cover removed.
Figure 2:
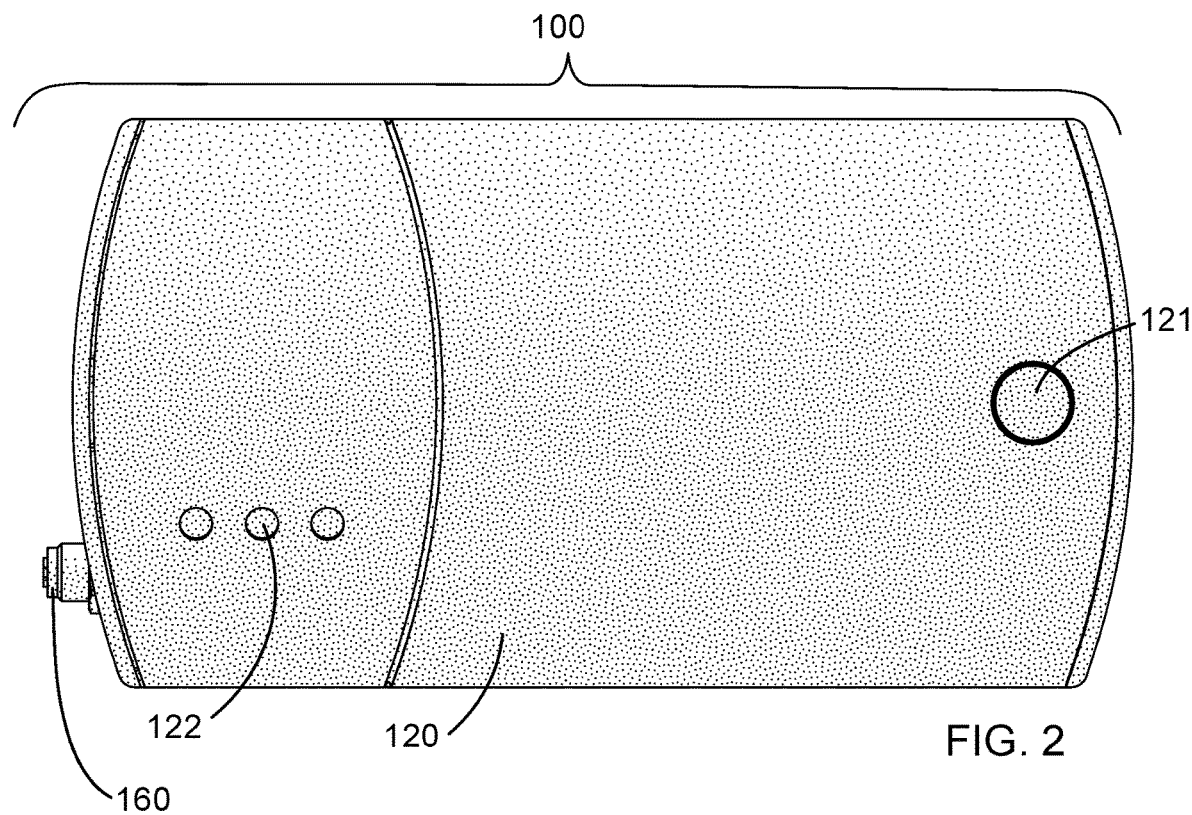
FIG. 2 is a top plan view of the leak detector of FIG. 1 with battery cover installed.
Figure 3:
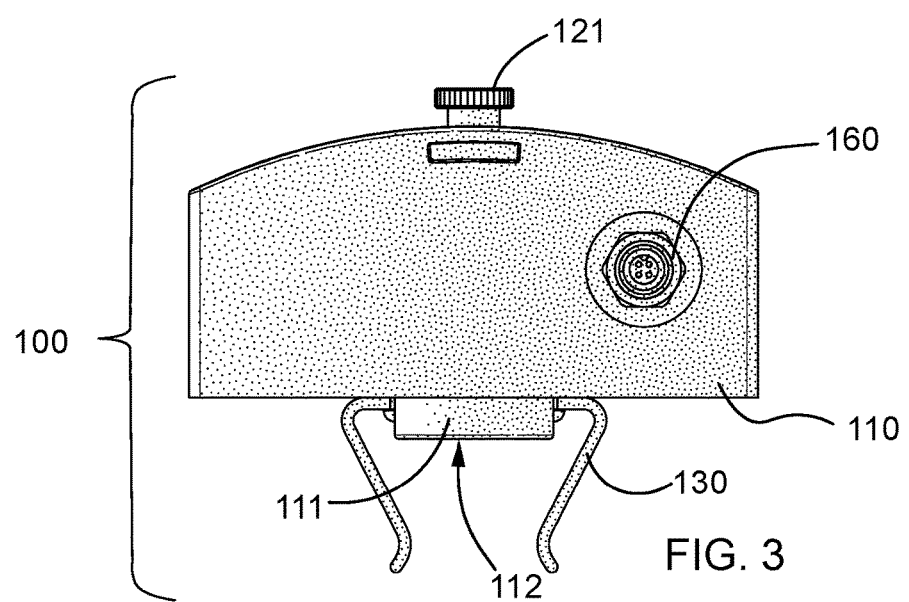
FIG. 3 is a left-end view thereof with battery cover installed.
Figure 4:
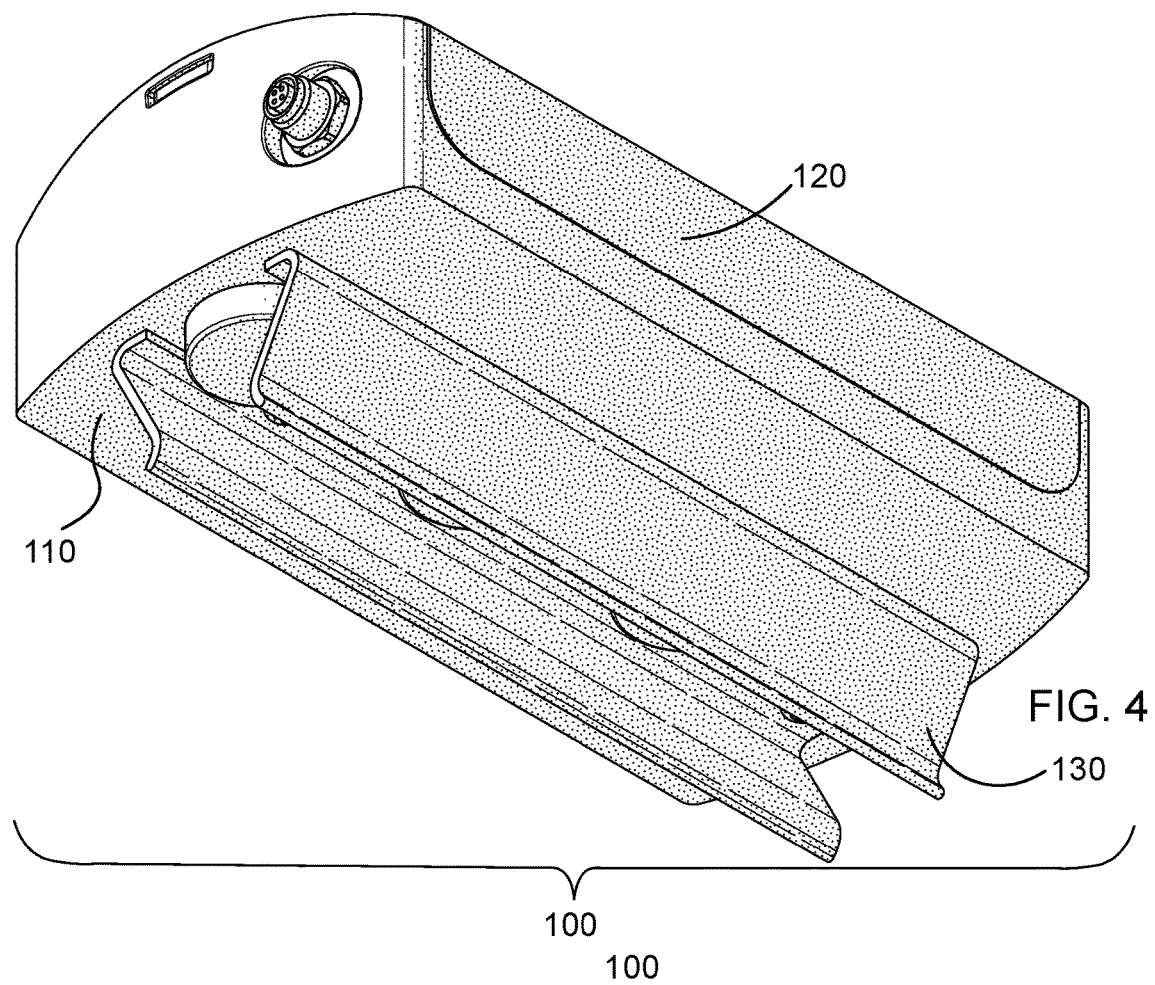
FIG. 4 is a bottom-left-front isometric view thereof showing spring-type pipe clamp.
Figure 5:
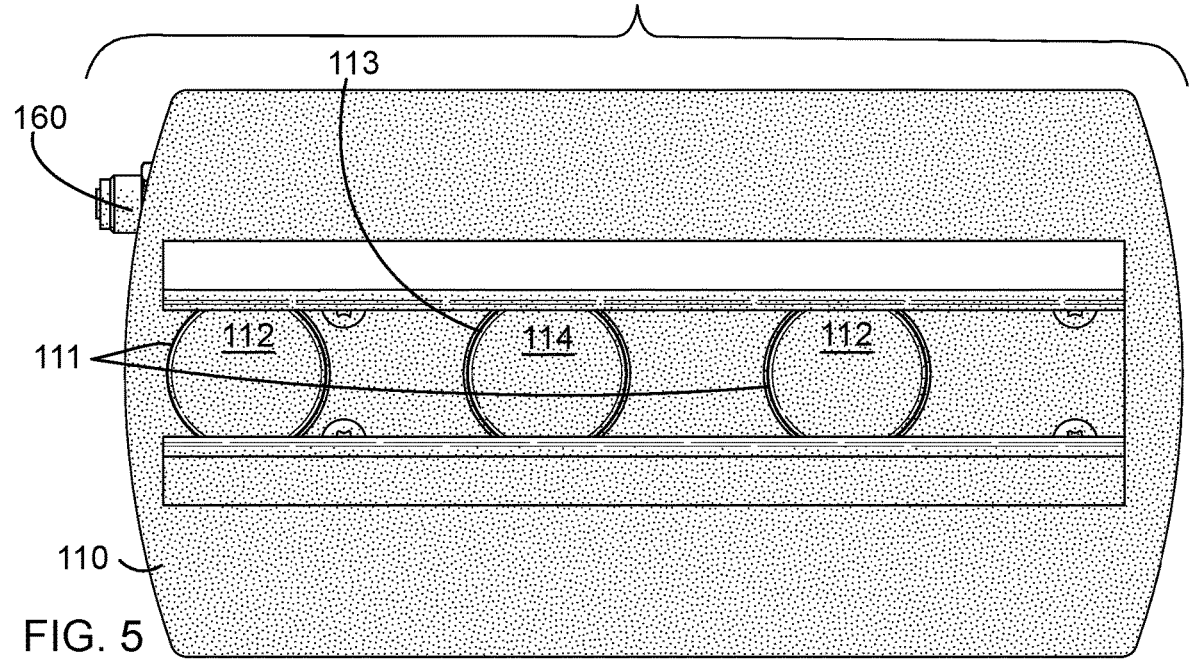
FIG. 5 is a bottom plan view thereof showing ultrasonic and temperature sensors.
Figure 6:
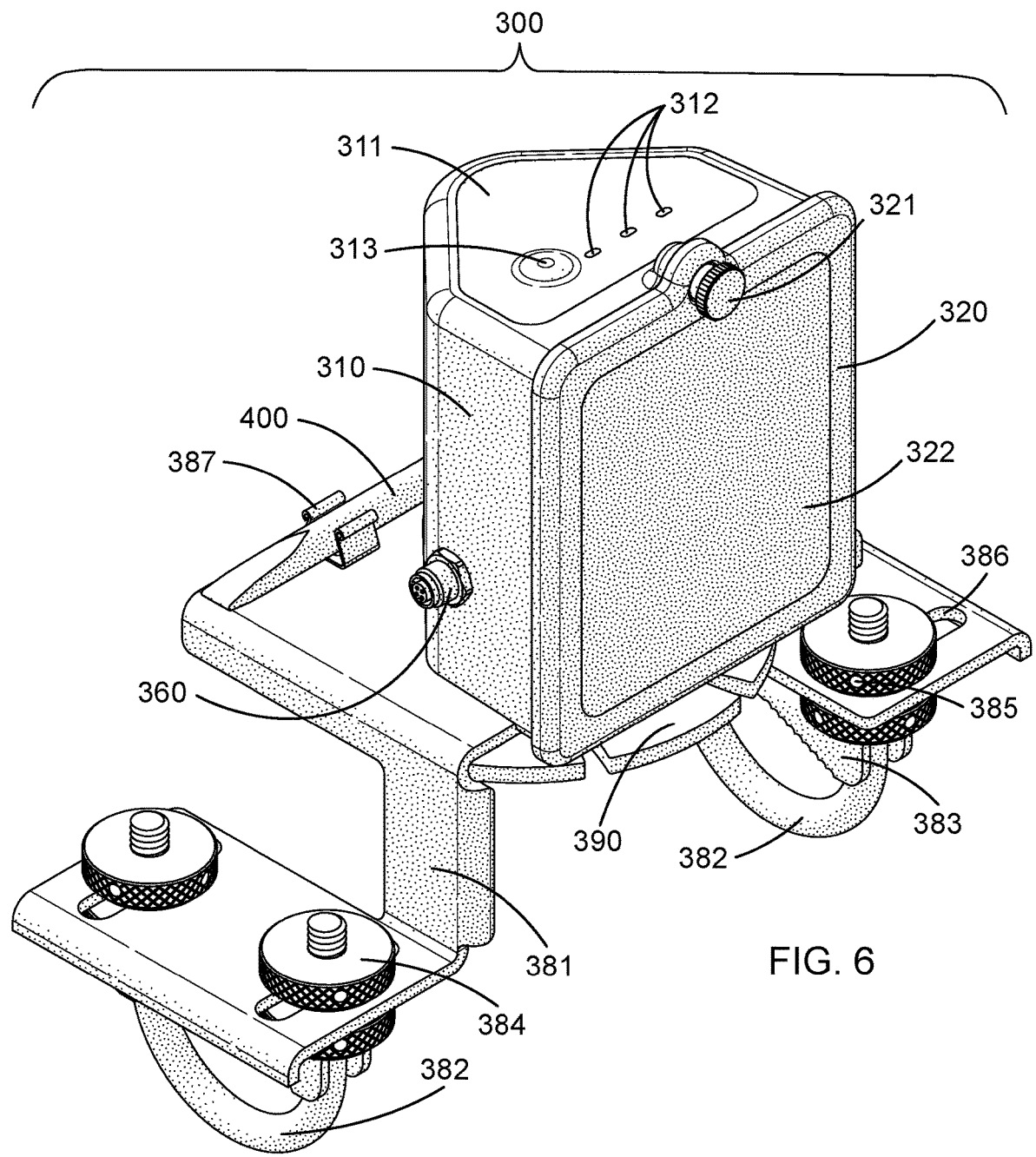
FIG. 6 is a top-left-front isometric view of one embodiment of a non-invasive battery-powered wireless shutoff-valve actuator.
Figure 7:
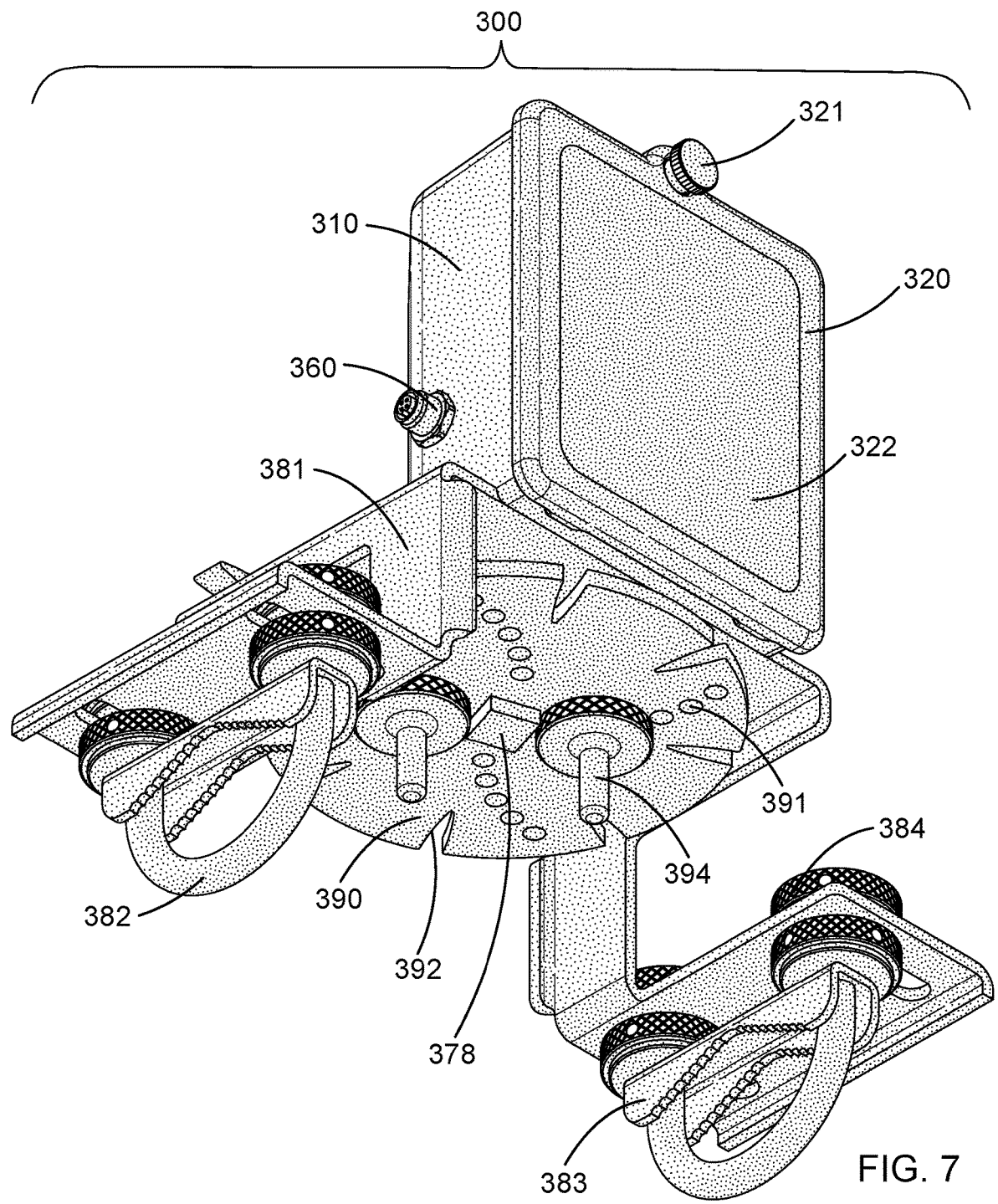
FIG. 7 is a left-bottom-front isometric view of the shutoff-valve actuator of FIG. 6 showing pipe clamp assembly and valve-actuator disk with repositionable pins.
Figure 8:
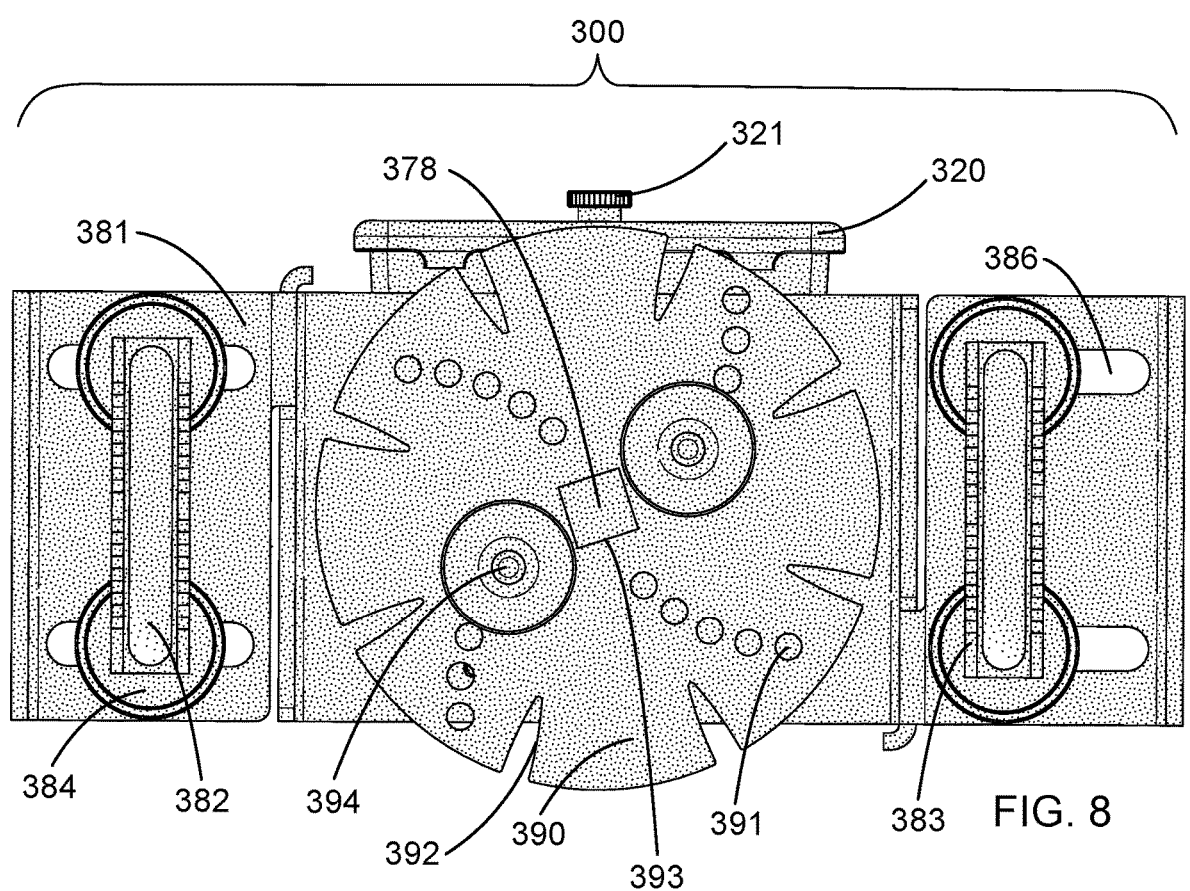
FIG. 8 is a bottom plan view thereof.

Embodiments of the present disclosure provide devices, components, systems, products, apparatuses, mechanisms and methods of use directed to independently powered, non-invasive means for detecting and/or preventing water leaks and, optionally, shutting off water flow through a pipe. In addition, aspects of the present disclosure can be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Aspects of the present disclosure also may take the form of a computer program product embodied in one or more computer readable medium(s) having computer readable program code embodied therein.

Any combination of one or more computer readable medium(s) can be utilized. The computer readable medium may be a computer readable signal medium or a computer readable storage medium. Illustrative, non-limiting examples of computer readable storage medium(s) can include an electronic, magnetic, optical, electromagnetic, infrared, or semiconductor system, apparatus, or device, or any suitable combination of the foregoing. In the context of this document, a computer readable storage medium can be any tangible medium that can contain or store a program for use by or in connection with, an instruction execution system, apparatus, or device. Additional examples of such medium(s) often include: an electrical connection having one or more wires, a hard disk, a portable data port and reader (including e.g., portable computer diskette), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the instant disclosure. It will be understood that each block of the flowchart illustrations and/or block diagrams, and combinations of blocks in the flowchart illustrations and/or block diagrams (with the exception of manual installation and testing blocks), can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 17:
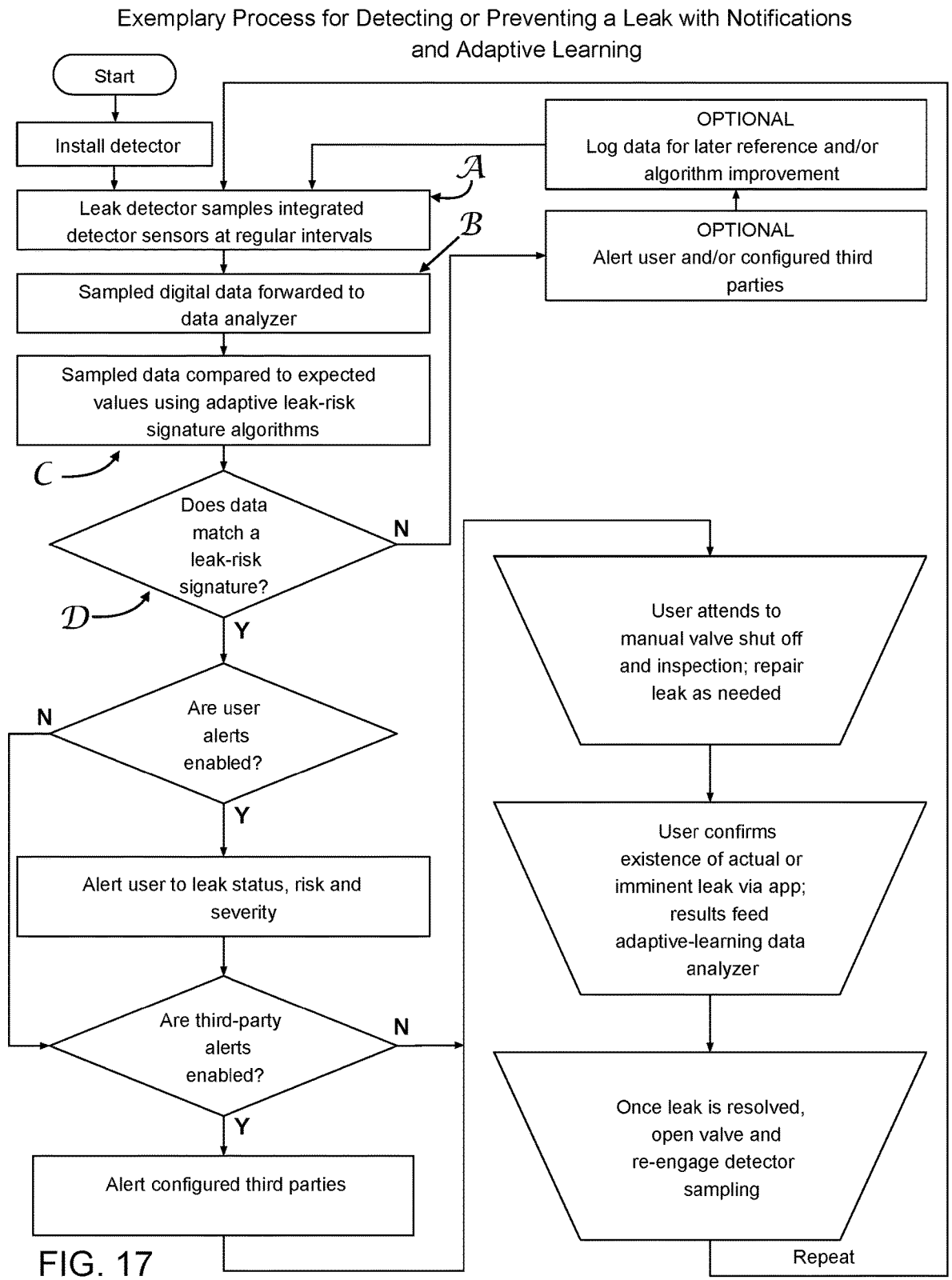
FIG. 17 is a flow chart of an exemplary method for installing and monitoring water flow using a water-leak detection device according to one embodiment of the present disclosure.
Figure 19:
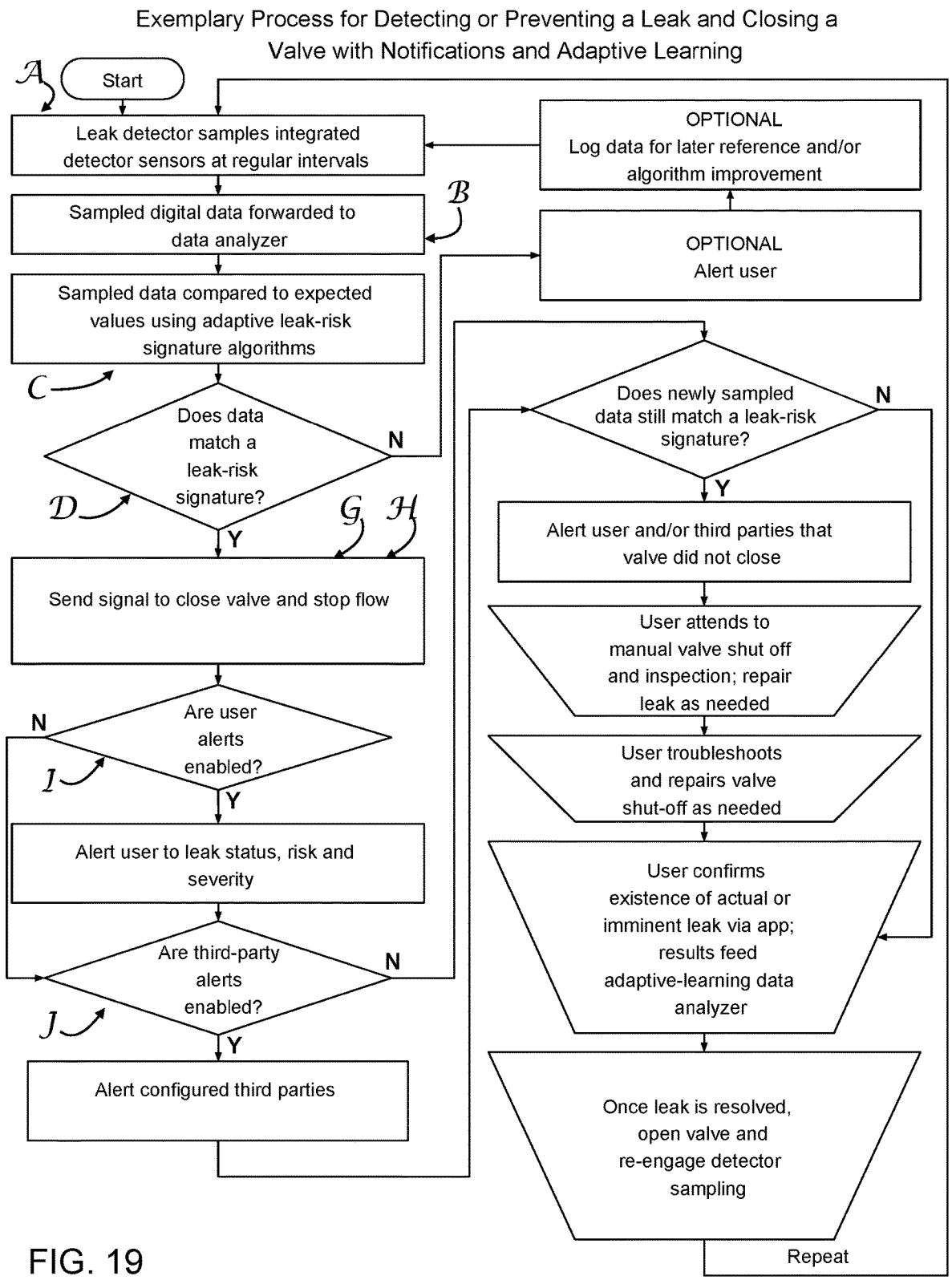
FIG. 19 is a flow chart of an exemplary method for monitoring and modulating water flow through a pipe using a combined water-leak detection device and water-valve actuator device according to one embodiment of the present disclosure.
Figure 20:
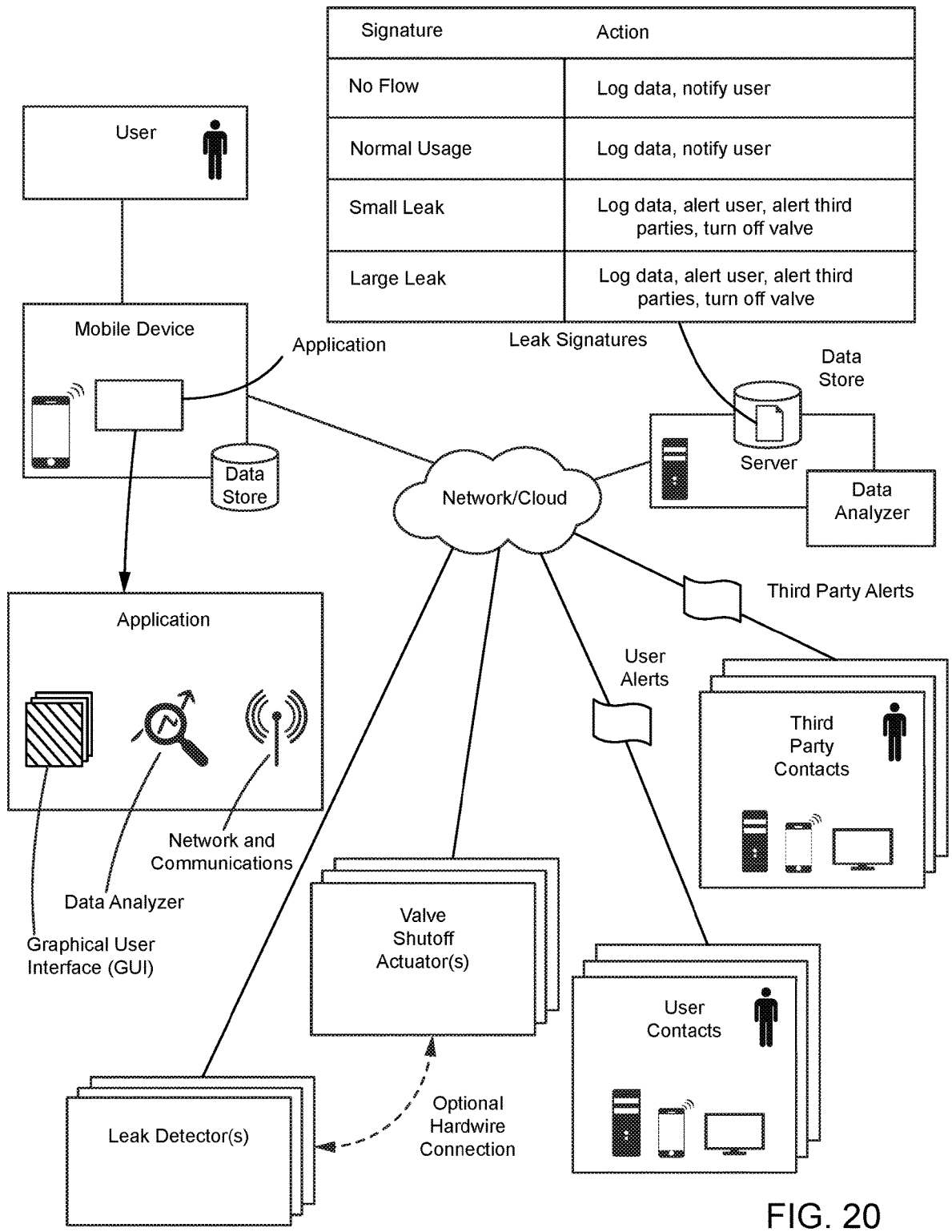
FIG. 20 is a schematic diagram illustrating a system according to one embodiment of the present disclosure that automatically monitors water flow through a pipe, communicates water flow status, including changes in the status, to a user through a communications application and, optionally, automatically shuts off water flow through the pipe according to preconfigured parameters, or on instruction from a user.

Provided herein is a pipe-leak detection device, system and method having particular utility for detecting liquid leaks, including leaks in water pipes in a building. Referring to FIGS. 17 and 19, the device, system and method disclosed herein comprise non-invasive means for sensing the flow of liquid in a pipe and means for gathering sampling data from the sensor(s) at preconfigured time intervals (Block A). The device, system and method also can comprise means for monitoring ambient environmental conditions such as temperature and humidity, which can provide useful information about potential anticipated fluid flow change.) Next, the device, system and method comprise means for communicating the sampled data to a data analyzer for evaluation (Block B); means for evaluating and comparing the sampled data to baseline values (Block C); and means for determining if the data sampled constitutes an anomaly (Block D).

The device, system and method further can comprise means for communicating the data output and/or a preconfigured message alert to a user and/or one or more preconfigured third parties. The device further can comprise means for communicating to a preconfigured valve shut-off actuator to close the valve and stop water flow. This means can be automated and/or communicated on instruction from the user. The device, system and method further comprise means for being independently powered, particularly the non-invasive sensors and data sampling and communication means thereof.

As indicated in the flow charts, the device, system and method further comprise means for logging data sampled for adaptive algorithm learning, means for monitoring water-flow status following water-valve shut off; means for alerting user and preconfigured third parties of status; and means for communicating with the preconfigured water-valve actuator to open one or more valves on instruction.

Figure 18:
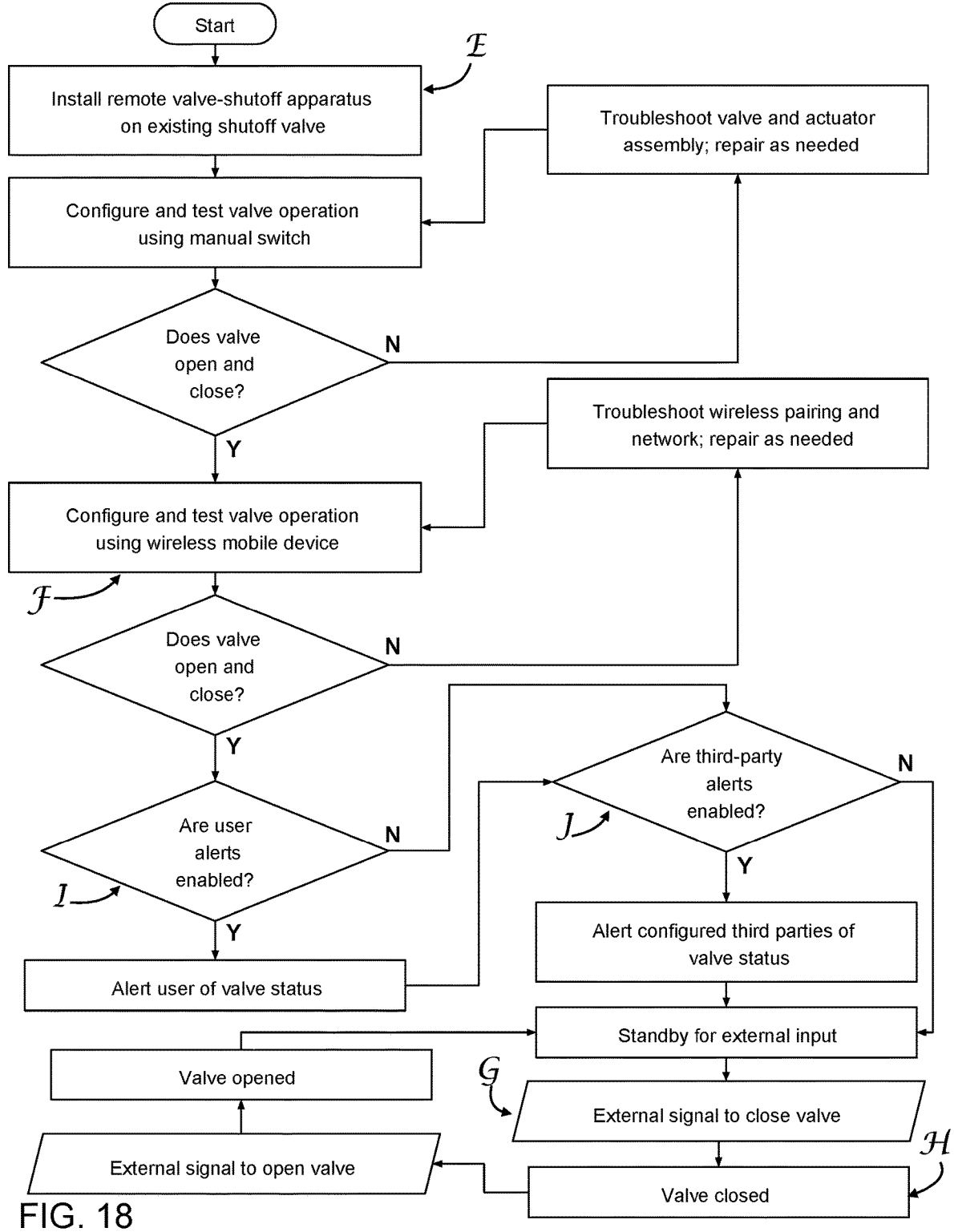
FIG. 18 is a flow chart of an exemplary method for installing and using a water-valve actuator device according to one embodiment of the present disclosure.

Also provided herein is a device, system and method for remote valve shut-off having particular utility for stopping liquid flow, including water flow, in pipes in a building. Referring to FIGS. 18 and 19, the device, system and method disclosed herein comprise means for non-invasively installing a valve-shut-off apparatus on an existing shut-off valve (Block E); configuring the device, system and method to communicate remotely and electronically with a user and/or a leak-detector device (Block F); and, as appropriate, setting the valve in the open flow position. The device, system and method further comprise means for receiving instructions on changing valve flow position from user, designated third parties and/or the detection device (Block G), and means for translating the instructions into a physical change in valve position, e.g., from open to closed (Block H). The device, system and method further can comprise means for communicating with remote users and/or designated third parties as to valve status (Blocks I, J). In addition, the device, system and method comprise means for being independently powered. Independent power can be provided by one or more self-contained batteries, and/or by cable connection with another device, including an associated water-leak detection device.

Referring to FIG. 19 a device, system and method for combined water leak detection and mitigation are provided, comprising the water-detection device/system/method and valve shut-off actuator/device system and method described above. The combined device, system and method comprise non-invasive, independently powered means for sensing dynamic flow rate in a pipe and, optionally, ambient environmental conditions; means for capturing sample data from the sensor(s) at preconfigured intervals (Block A); means for communicating the data to a preconfigured data analyzer (Block B); means for comparing the data to predetermined baseline values (Block C), and means for determining if a flow-rate anomaly has occurred ("leak-risk signature", Block D). In one embodiment, the data analyzer comprises one or more adaptive heuristic algorithms.

The combined device/system/method further comprise means for communicating to a preconfigured valve shut-off actuator with instructions to shut off valve and means in the configured valve actuator to translate the instructions into a physical change in valve-actuator position (Block G, H); as well as, optionally, means for communicating with remote users and/or designated third parties as to actuator and/or water flow status (Blocks I, J).

EXAMPLES

Provided below are detailed descriptions of illustrative, non-limiting device embodiments according to the present disclosure.

Example 1

Figure 11:
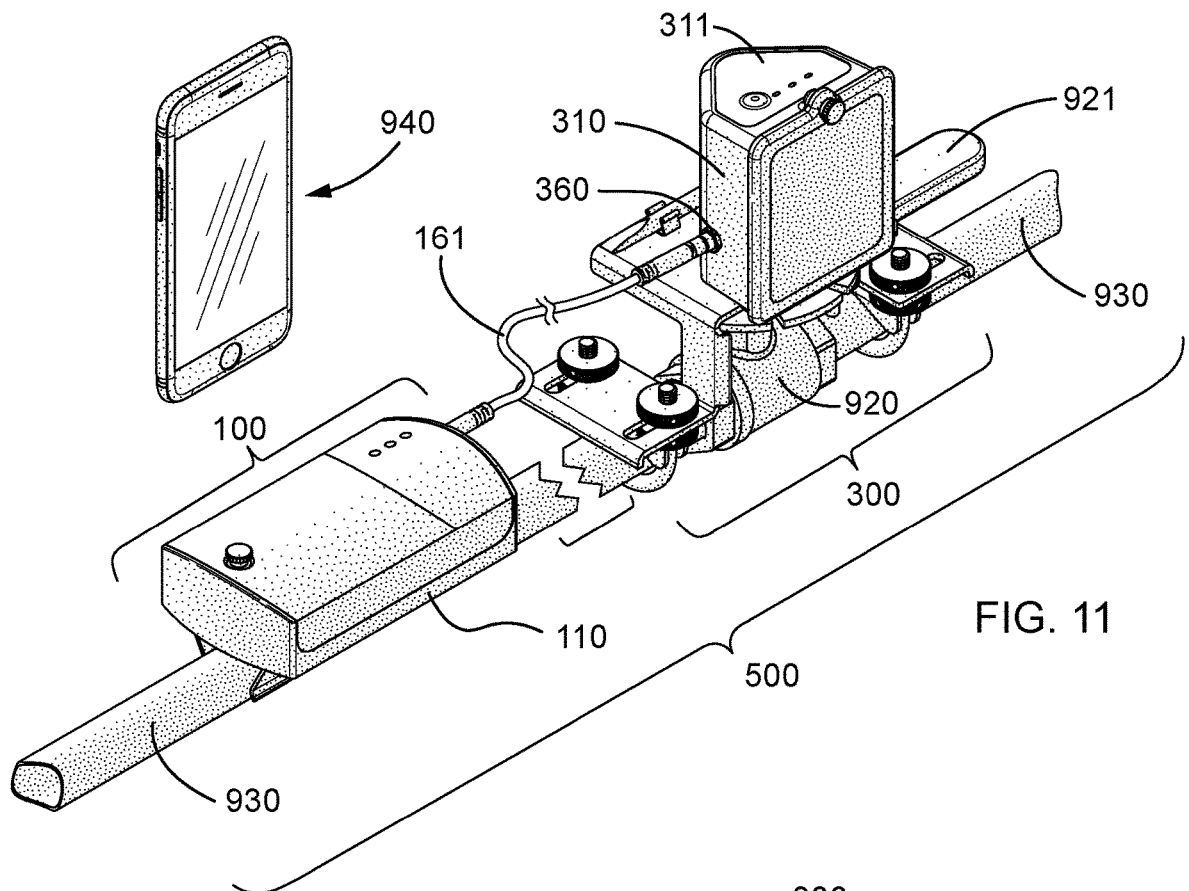
FIG. 11 is a left-top-front isometric view showing the combined leak detector of FIG. 1 and shutoff-valve actuator of FIG. 6 installed as a system on a water-supply pipe with a pre-existing quarter-turn ball shutoff valve, including a mobile device for remote wireless setup and control.
Figure 12:
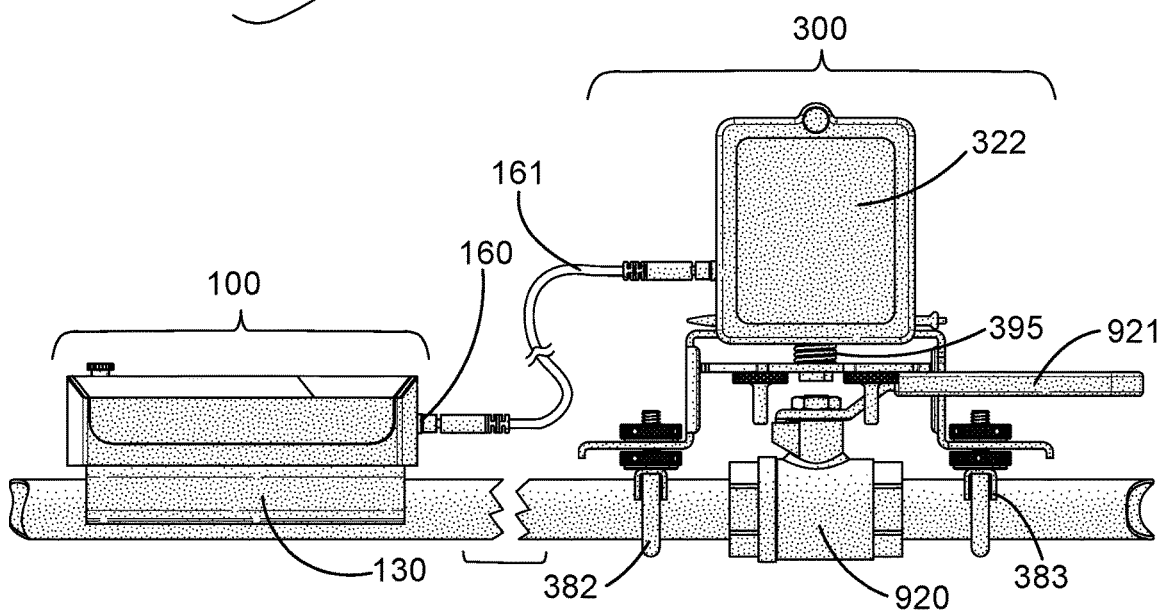
FIG. 12 is a front plan view of the combined leak detector and valve actuator of FIG. 11 installed on a water-supply pipe with a pre-existing quarter-turn ball shutoff valve.
Figure 13:
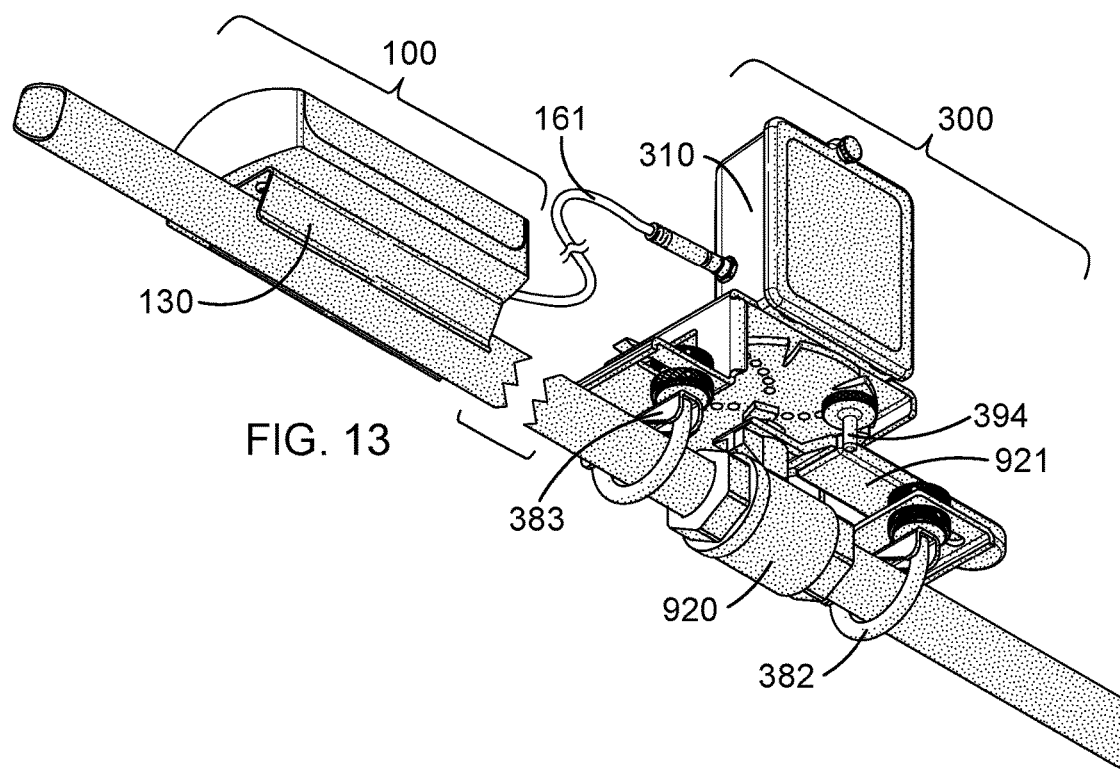
FIG. 13 is a left-bottom-front isometric view of the combined system of FIG. 12.
Figure 14:
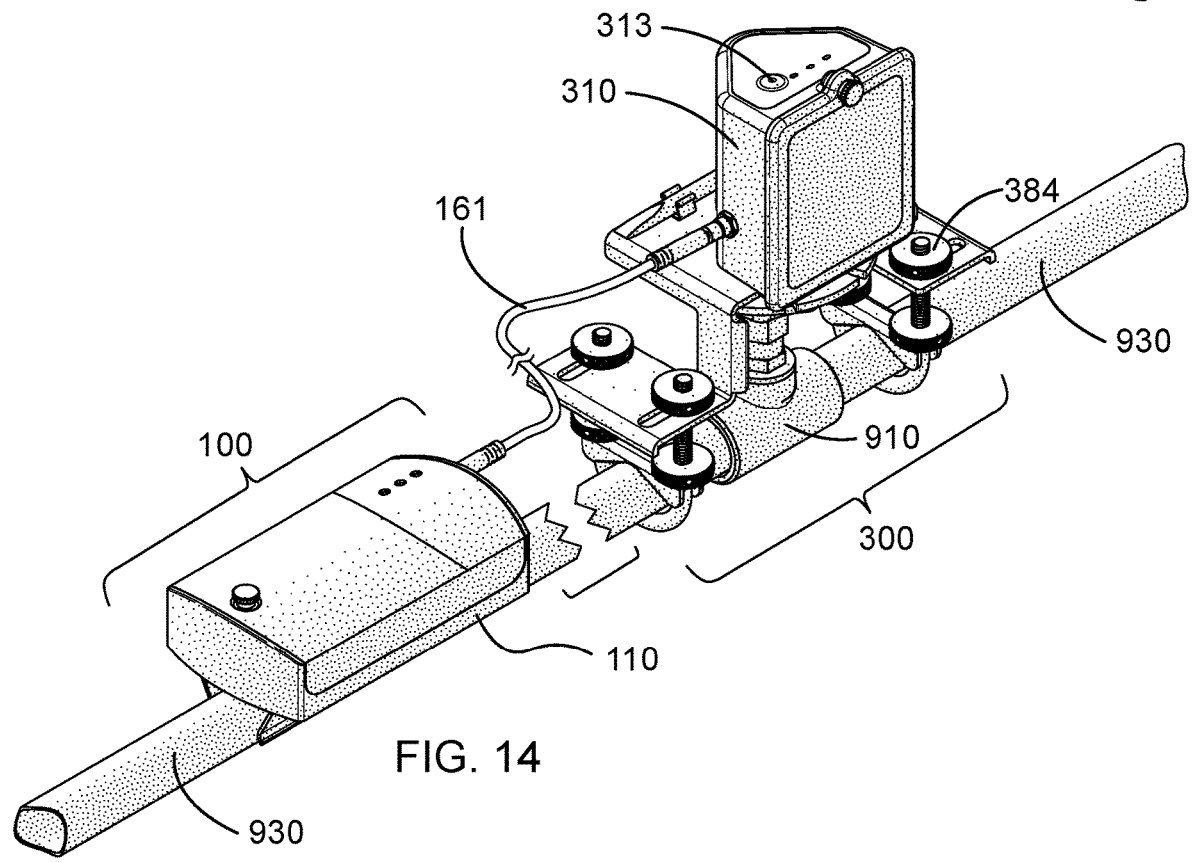
FIG. 14 is a left-top-front isometric view of the combined leak detector of FIG. 1 and shutoff-valve actuator of FIG. 6 installed on a water-supply pipe with a pre-existing multi-turn gate shutoff valve.
Figure 15:
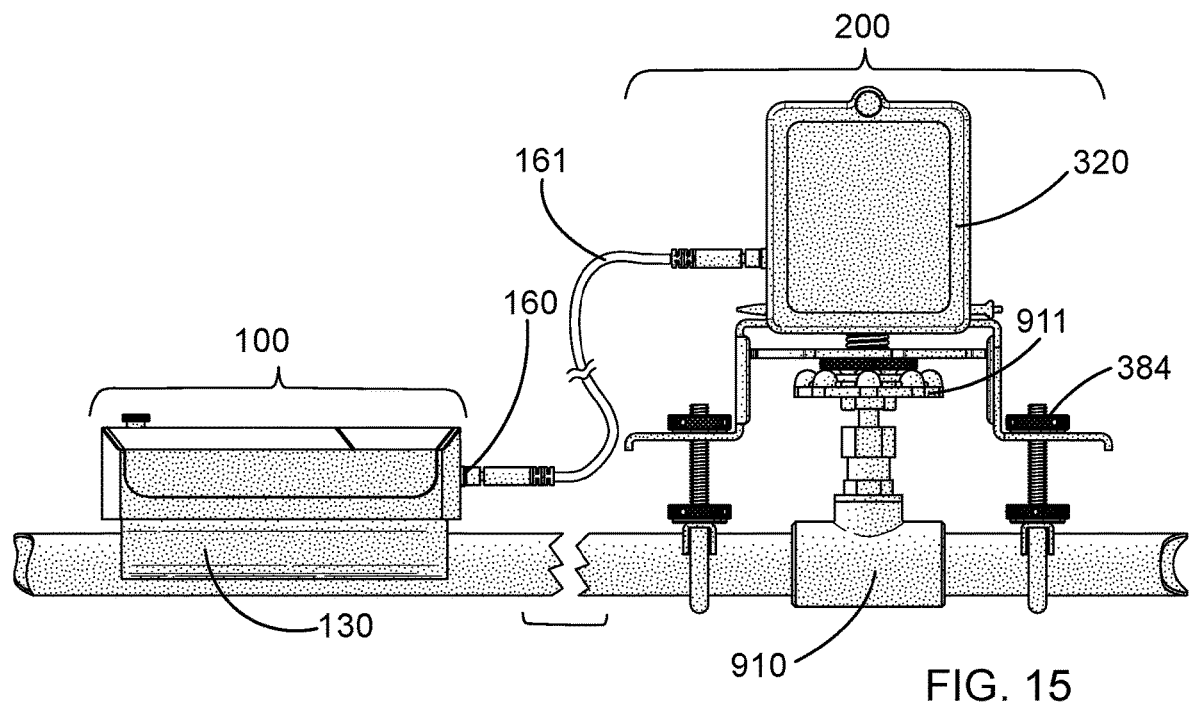
FIG. 15 is a front plan thereof.
Figure 16:
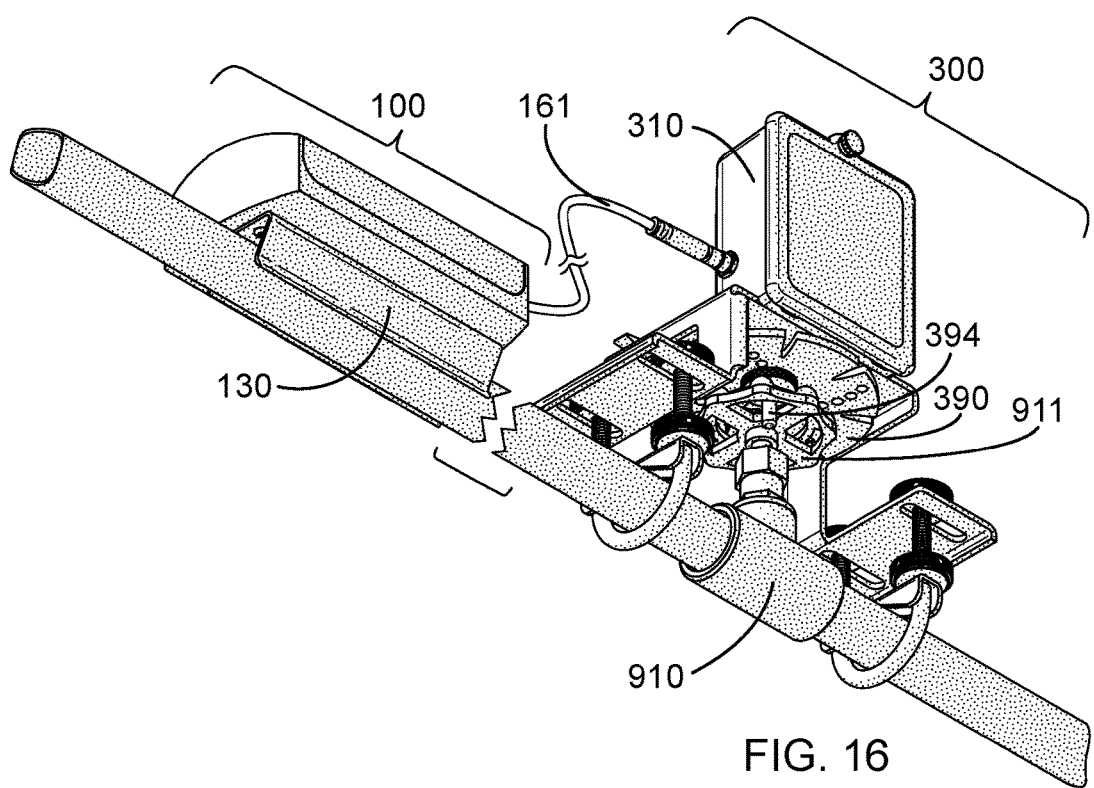
FIG. 16 is a left-bottom-front isometric view thereof.

FIG. 11 shows an end-to-end leak-detection and valve-shutoff apparatus 500, which may consist of one or more non-invasive, battery-operated wireless leak-detector assemblies 100 attached to a water-supply pipe 930; one or more automated, non-invasive, battery-operated shutoff-valve assemblies 300 attached to both a water-supply shutoff valve 920 and water-supply pipe 930 or valve body, an optional interconnecting communications cable 161, and a wireless network-connected mobile device 940 for remote configuration, control, alarming and analytics. Shutoff valve 920, pipe 930 and mobile device 940 are shown for environmental reference.

FIGS. 1-5 show different views of one, illustrative, non-limiting embodiment of a non-invasive, battery-operated, wireless ultrasonic leak-detector assembly 100, which may contain a bottom electronics enclosure 110, a top interlocking battery and electronics cover 120, and a captive thumb-screw 121 to secure the battery cover 120 to a female threaded standoff 115 in the bottom electronics enclosure 110. The battery cover 120 can further include one or more light holes 122, waterproof window overlays, or molded light pipes for status LEDs indicating system operating health. Status indicators can convey operating conditions including, without limitation, battery power, Wi-Fi or network connectivity, leak alarms and the like. Other status indicators are contemplated and not limited to these three.

The bottom electronics enclosure 110 can include two integrated cylindrical transducer wells 111 (FIG. 5) that house piezoelectric ultrasonic transmitters and receivers with an angular "V" or "W" transmission bounce-path between them. A third sensor well 113, in the example approximately equidistant between the two ultrasonic transducer wells 111, can house a pipe-surface temperature sensor, which may be, for example, without limitation, a non-contact infrared (IR) sensor, direct-contact thermocouple, thermistor, diode or serial-digital temperature sensor. Exemplary non-invasive pipe attachment means are illustrated here. In the figures, the bottom electronics enclosure 110 may attach via fasteners to a removable, user-changeable spring-type pipe clamp 130 to secure the leak-detector assembly 100 to a wide range of pipe 930 diameters and materials. Although a unibody spring-type clamp 130 is shown in the leak-detector embodiment 100, those having ordinary skill in the art will understand that other pipe-mounting methods can be used to advantage including, without limitation, U-bolts, V-bolts, lever-type spring clamps, flexible straps, cable ties, or a weather-resistant wrap-around case with security latches.

The bottom electronics enclosure 110 may further contain and protect essential electronic and mechanical components, which may include, without limitation, one or more printed circuit board (PCB) assemblies 140, one or more status indicator LEDs 141, one or more threaded fasteners 142, battery holder 150, and a multi-conductor communications connector 160. During installation, the user may apply an ultrasonic coupling medium to the bottom surfaces 112 (FIG. 5) of the transducer wells 111 to improve acoustic coupling between the pipe and the ultrasonic transducers contained within the transducer wells 111. The coupling medium may be an ultrasonic gel pad, high-viscosity ultrasonic gel (e.g. Echo Ultrasonics® Sensor ZH™ or similar), metal foil, or other suitable thermoplastic coupling material that conforms to and compresses against the pipe 930 radius at the tangential point of contact between the pre-existing pipe 930 and the ultrasonic sensor wells 111. Similarly, in the case of a contact-type temperature sensor, the user may also install thermally conductive grease to the bottom surface 114 (FIG. 5) of the temperature-sensor thermowell 113 such as 3M® TCG-2035 to improve thermal conductance between the temperature-sensor thermowell 113 and water-supply pipe 930.

Example 2

For typical domestic and light-commercial use, the leak-detector assembly 100 accommodating standard materials and components, can measure in the range of about 130 mm long, 70 mm wide and 40 mm high, excluding the user-installable spring clamp 130. Larger and smaller enclosure dimensions or clamp dimensions can be specified to accommodate other pipe sizes or different battery capacities that may be required in certain commercial or industrial applications. These are within the skill in the art to determine in view of the instant disclosure, and are contemplated as within the scope of the instant disclosure.

The bottom electronics enclosure 110 and battery cover 120 can be made using standard materials well known in the art. For example the enclosure and/or cover can be injection molded, milled or 3D-printed from a durable thermoplastic resin, such as Covestro Makrolon® polycarbonate, DuPont Delrin® acetal homopolymer, or comparable material suitable for a wide in-service ambient temperature range between −40° C. and +60° C. or beyond.

Although thermoplastic may be preferred for economy, electrical isolation and corrosion resistance, the bottom electronics enclosure 110 and/or the battery cover 120 may also be cast, milled, or 3D-printed from suitable metal alloys containing aluminum, zinc, magnesium, or stainless steel, for example. An optional sealing means, such as, for example, a continuous silicone gasket (not shown) or similar sealer between the bottom electronics enclosure 110 and battery cover 120 may also be included along the enclosure ridgeline 116 to improve resistance to dust, outdoor water penetration, and inclement weather for an IP-67 or NEMA-4 enclosure rating.

Example 3

In the example where the water flow-rate sensor comprises ultrasonic detection, ultrasonic piezoelectric transducers contained within the transducer wells 111 may be spaced approximately 75 mm to 100 mm apart, although shorter or wider separation may be advisable with suitable calibration depending on the target pipe diameter, pipe-wall thickness, and pipe material. A "V" shaped ultrasonic bounce pattern provides a shorter transmission distance and higher received power. A "W" shaped ultrasonic bounce pattern effectively increases the transmission length for a given lineal distance between transducers, but with the attendant decrease in received power. The choice of a "V", "W" or even a direct angular transmission across the pipe (with no bounce) results in tradeoffs between received power, noise immunity, minimum leak detection rate, and interference from turbulence. This disclosure anticipates acoustic energy transmission as a stated means for measuring water flow-rate changes, including one or more of the stated methods herein of acoustic energy transmission.

Example 4

In the example where an ambient environment sensor includes a temperature sensor, the temperature sensor inside the thermowell 113 can measure the pipe 930 (FIG. 5) surface temperature, for example, which may approximate the water temperature inside the pipe.

Example 5

The ultrasonic transducers contained within the transducer wells 111 may use the time-of-flight (TOF) method to alternatively transmit and receive a high-frequency pulsed waveform, which may vary between 20 kHz and 40 MHz, although other frequencies, waveforms, or spread-spectrum signals may be more optimal depending on the physical pipe 930 characteristics and desired sensitivity. As media (water) flows through the pipe 930, precision internal timers measure the time between the transmit and receive signals that bounce off the inner wall of the opposing side of the pipe 930. In the direction of fluid flow, the time will be slightly less than the direction opposite to the flow. Using the Doppler principle of differences in received signal frequencies or recovered pulse timing, comparing the two readings allows very small measurements over a wide range of flow rates. Digital signal processing may filter noise and dynamic fluid turbulence to improve leak-detection accuracy.

As defined in the Badger Meter white paper "Ultrasonic Metering for Small Water Meter Applications," the average difference between the two time-of-flight readings indicates the media velocity through the pipe.

$$V=[(T2-T1)\times L]/[(T1\times T2)2]$$

Where:
V=Velocity of media (water)
T1=Time for transmit signal to travel downstream from transducer A to Transducer B
T2=Time for signal to travel upstream from transducer B to A
L=Effective path length between transducer A and B (this is not necessarily the same as the linear spacing distance between sensors, as consideration of reflection path is critical)

Knowing the internal pipe cross-sectional area, it is possible to compute the flow volume:

$$Fv=A*V$$

Where:

Fv is the volumetric flow rate (in liters or gallons per minute)

A is the cross-sectional area of the portion of pipe containing the liquid

V is the computed velocity of the media

The leak-detector PCB assembly 140 may include functions such as transducer waveform transmission and reception, time-of-flight (TOF) analysis with picosecond-level resolution, autocorrelation of received waveform, digital filtering and noise reduction, transmission boosting and receive pre-amplification, power management, calibration, and wireless communication via Wi-Fi or similar network radio interface. A dedicated and integrated water-flow micro-controller such as the ACAM/AMS GP-30 or similar manages the real-time signal processing related to time-of-flight calculations, whereas a general-purpose, low-power micro-controller manages overall operation, including user interface, alarms, and wireless data communications via a commonly available wireless network protocol. Although Wi-Fi is shown in the current, exemplary embodiment, other wireless connectivity methods are comprehended as part of the instant disclosure, including Bluetooth Low Energy (BLE), LoRa, proprietary ISM-band wireless protocols, and cellular-connected radio using LTE, narrowband LTE, or CAT M-1 data services, for example.

Example 6

Prior to or upon installing the leak-detector assembly 100 into place and ensuring that the leak detector is securely mounted, the user may remove the battery and electronics lid 120 using, e.g., the captive thumb-screw 121, and install batteries to prepare the unit for initial calibration and wireless connectivity. Wide temperature-range batteries, such as Energizer® Ultimate Lithium, may be used to advantage to ensure adequate power delivery across an extreme temperature range between at least −40° C. and +60° C., and other batteries are considered useful.

If desired, indicator LEDs 141 can be configured as desired to communicate device status. For example, indicator LEDs can be configured such that they blink sequentially during initial boot-up until the unit has completed a successful self-test (e.g., 5-10 seconds). Similarly, the device can be configured such that, for example, following successful boot-up, power LEDs flash briefly once every few seconds to confirm that adequate power is applied to the-leak detector assembly. During the initial boot-up, indicator LEDs 141 may sequentially blink until the unit has completed a successful self-test (e.g., 5-10 seconds). The absence of flashing LEDs therefore can indicate that the batteries need replacing, or that some other failure has occurred. Or, in the event of a fault, an Alarm/Fault light can blink, indicating a device failure or misconfiguration. Additional fault conditions can be viewed on the mobile device 940.

The user may be guided through a wizard-based configuration procedure that relies initially on a local peer-to-peer wireless-communication link between the leak-detector assembly 100 and the mobile device 940. The configuration procedure may also include questions regarding the pipe 930 outer diameter, wall thickness (if known), material, location of leak detector 100, distance to nearest joint or valve, alarm and notification preferences, possible Wi-Fi host name and password, as well as other application-specific calibration processes or learning modes necessary to detect leaks while mitigating false alarms. An intelligent database of common pipe materials may aid the user by automatically pre-populating essential physical pipe 930 data based on a generic description for which comprehensive technical standards exist, such as for 1" Copper Type L or ¾" Schedule 80 PVC, for example.

Example 7

FIGS. 6-10 show one embodiment of a companion non-invasive, battery-operated, wireless shutoff-valve actuator assembly 300 that may include a main electronics enclosure 310 incorporating a recessed switch and LED overlay 311, removable interlocking battery and electronics lid 320 with recessed label 322, said lid 320 being secured by the captive thumbscrew 321 that mates with threaded insert 315. The main electronics enclosure 310 can contain and protect essential electronic and mechanical components including one or more printed circuit board (PCB) assemblies 340 (FIG. 10), PCB fasteners 342, one or more status indicator LEDs 312 (FIG. 6), valve on/off manual override switch 313, battery holder 350, and multi-conductor connector 360. The chassis-face edge 316 of the main electronics enclosure 100 can also include a sealing means, including a silicone gasket or similar sealant, to improve resistance to dust, outdoor water penetration, and inclement weather for an IP-67 or NEMA-4 enclosure rating.

Figure 10:
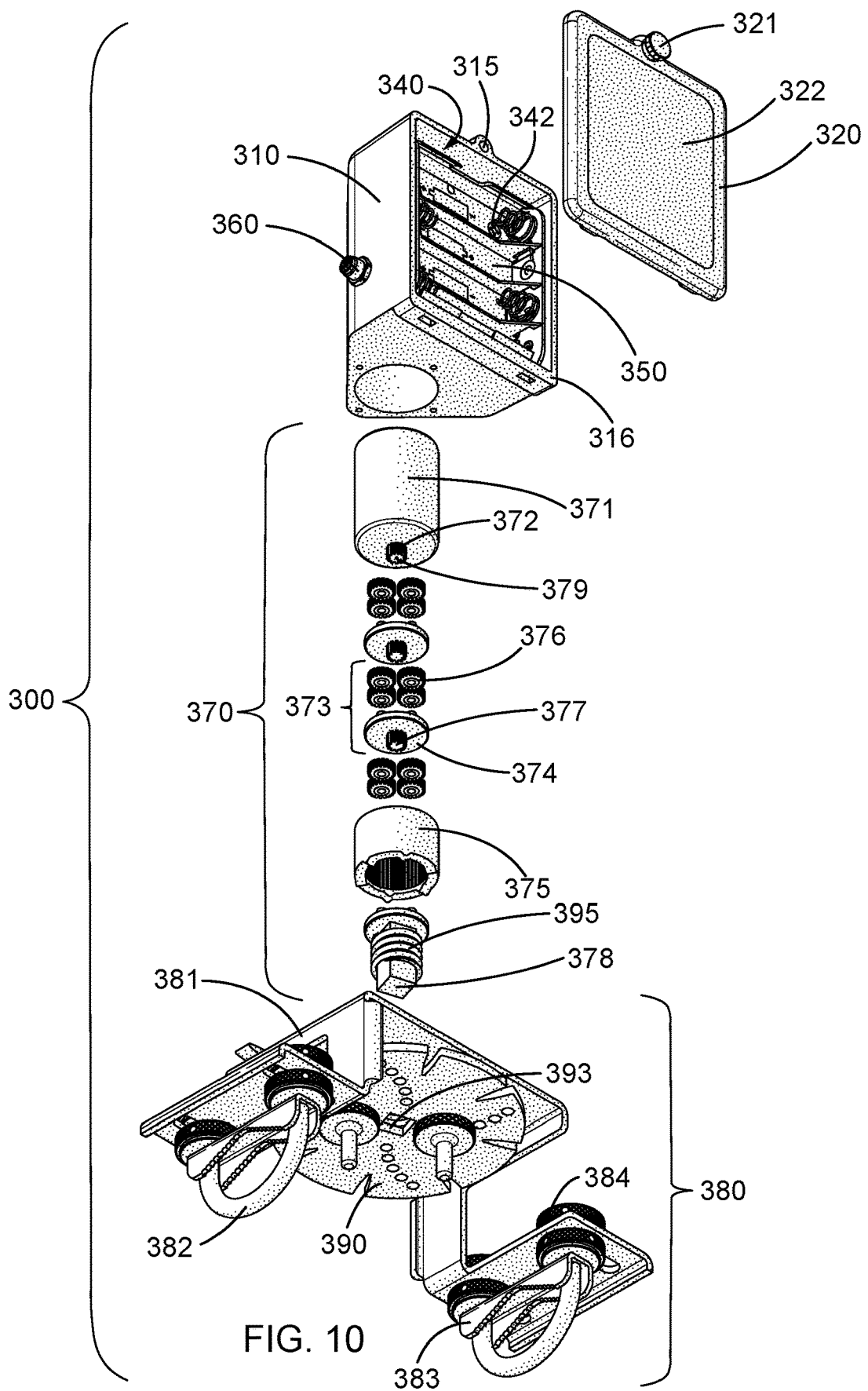
FIG. 10 is a left-bottom-front isometric exploded view thereof with battery cover removed, showing motor, gears and compression spring.

As shown in FIG. 10, one exemplary main electronics enclosure 310 is illustrated, which can house a motor and geared torque-conversion assembly 370. In the figure, the exemplary assembly comprises a bidirectional electric motor 371, a rotating motor shaft 379, a sun spur gear 372, one or more planetary gear sets 373, each planetary gear set consisting of one carrier gear 374 with attached sun spur gear 377 and two or more planet gears 376, one internal ring gear 375, and final drive carrier gear 378 with attached square-drive shaft and compression spring 395.

The combination of the motor and the gears reduces rotational speed at each successive stage to increase overall torque at the final drive shaft 378. In applications where torque is more important than rotational speed, design emphasis can be on maximizing torque for a given power consumption within a compact form factor. As will be appreciated by those having ordinary skill in the art, the number and type of gears that can be employed, and the motor type and orientation of the components are flexible and can be varied as desired to suit the application. In one, non-limiting, example, useful dimensions of a main electronics enclosure 310 for home and light-commercial applications can be in the range of about 70 mm wide by 80 mm tall by 60 mm deep. Smaller or larger sizes may be desired to support different valve sizes and/or motors.

Valve-actuator PCB assembly 340 can include functions such as bidirectional motor control, load-current sensing for automated valve starting and stopping of both ball valves (quarter-turn) and gate valves (multi-turn), power management, wired communication, and wireless communication. Motor-current sensing is preferred to prevent premature motor burnout, overheating, or excessive battery drain once a valve achieves its full close or open condition.

Example 8

One exemplary, non-limiting means for attaching a non-invasive, battery-operated, wireless shutoff-valve actuator assembly to a water supply pipe is illustrated in FIG. 10. In the figure, subassembly 380 provides means for non-invasively attaching the assembly 300 to a water supply pipe. Subassembly 380 can include a rigid bracket including, for example, a metal or sturdy thermoplastic bracket 381, metal U-bolts 382, serrated V-channels 383, and thumb nuts 384 to securely grip the attached water-supply pipe 930. For residential and light commercial use, useful U-bolts 382 may have a diameter of in the range of about 38 mm to support a nominal pipe size range of ½" to 1¼". U-bolt sizes and related dimensions can be adjusted proportionally as desired or needed to support other pipe sizes, including larger pipe sizes such as 1½" and higher. Oblong slots 386 are illustrated (see FIG. 8) as one means for allowing horizontal adjustment of U-bolts 382 to accommodate physical variations between different pipe and valve sizes, including allowance for solder joints or unions. Depending on available space, the reversible design of bracket 381 can allow the overall assembly 300 to be mounted in a front-facing or rear-facing orientation, while also accommodating a ball valve whose handle is installed in either one of two possible orientations.

Example 9

One exemplary, non-limiting means for attaching a non-invasive, battery-operated, wireless shutoff-valve actuator assembly's main electronics enclosure 310 to subassembly 380 is illustrated in FIGS. 7-10. In the figures, a square drive shaft 378 can insert into a rotating valve-actuator disk 390 through a concentric square hole 393. In one embodiment, useful in residential and light-commercial applications, disk 390 can have a diameter in the range of about between 70 and 100 mm, including between 80 and 85 mm, and can have a thickness between 2 and 5 mm, including between 3 and 3.5 mm.

One non-limiting exemplary means for actuating valve shut off and which can accommodate a wide range of ball and gate valve handles and configurations also is illustrated in the figures (see, e.g., FIGS. 10-15). On disk 390, two opposing sets of threaded holes 391 can be arranged at 90-degree offsets to secure two opposing pins 394, one positioned at a 180-degree offset from the other, and is designed to engage and turn an attached gate-valve handle 911 or ball-valve handle 921 through physical abutment to a portion of the handle. The center-to-center distance between threaded holes 391 can be in the range of about 6-8 mm.

The adjacent set of holes 391 at a 90-degree offset is positioned radially in between, and can have a 3-4 mm offset from the first set of holes. The arc trajectory of threaded holes 393 allows a larger number of holes to fit within a limited radius compared to a linear layout. This optimizes fine-tuned adjustment of the actuator pins to accommodate a wide range of ball and gate valve handles and configurations. Alternatively, the holes 393 could be replaced with a continuous arc and modified pin design to accommodate an infinitely variable pin position.

Compression spring 395 concentrically installed over the square drive shaft 378 can ensure that valve-actuator disk 390 remains securely positioned over either a gate or ball valve handle, including allowance for variable stem height as a multi-turn gate valve is turned on or off.

Example 10

Figure 9:
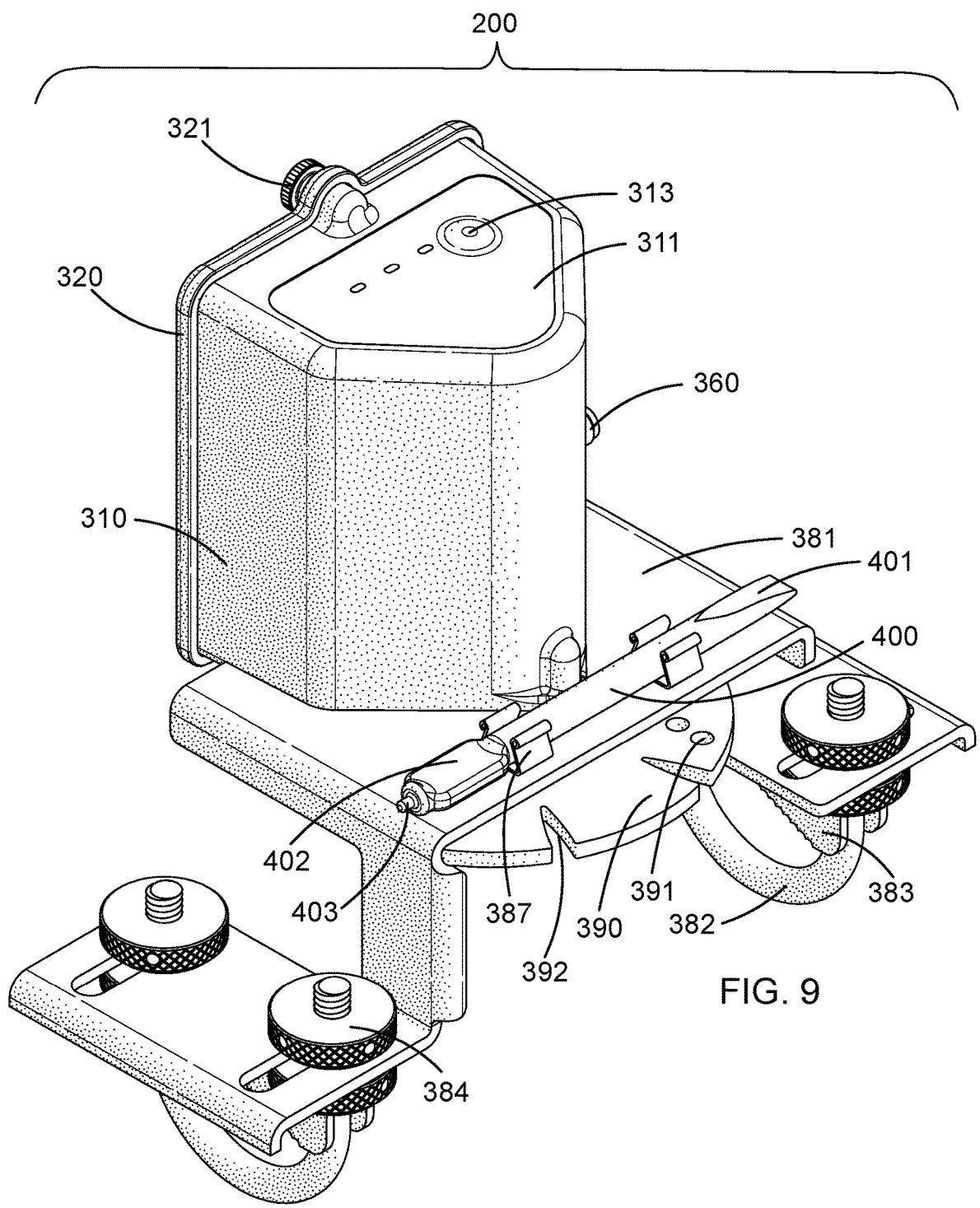
FIG. 9 is a right-top-rear isometric view thereof showing indicator lights and removable installation and shutoff tool.

To assist in the mechanical installation of assembly 300 to pipe 930, and t simplify manual turn-off or turn-on of pre-existing gate valve 910 or ball valve 920, assembly 300 can include a mechanical installation means, including, e.g., a tool 400 (see e.g., FIG. 9). Tool 400 can be securely and removably attached to bracket 381 by, for example, one or more retaining clips 387. One end of tool 400 can include a flat-tapered screwdriver face designed to engage one of the multiple V-grooves 392 spaced equidistantly around the perimeter of actuator disk 390. The opposing end of installation tool 400 may include a flat handle 402 to improve gripping, and a cylindrical pin 403 designed to insert into holes 385 on the perimeter face of thumbnuts 384. In one exemplary alternative configuration, hex nuts could be used in place of thumbnuts, and the tool 400 could be modified to include a hex wrench cutout on one end for tightening the hex nuts. The tool could be made from any useful materials including, without limitation, stamped or laser-cut metal plate.

As will be appreciated by those having ordinary skill in the art, in the instance where a device is being installed on older water pipes and older shutoff valves that may have become frozen in place, it may be advantageous to lubricate and test valve torque prior to installation. In the case of a gate valve, the valve preferably is fully shut off (multiple turns), and then turned fully on, then backed off a quarter turn from its full open position. Taking this step can materially reduce the torque requirements that would otherwise be required without such a procedure. Similarly, with a ball valve, the handle preferably is turned 90-degrees to the off position, then back on again to the on position.

Example 11

Prior to or following installation of shutoff-valve actuator assembly 300 into place and ensuring that it is securely mounted via tightening of the thumb nuts 384, the user may remove the battery lid 320 using the captive thumbscrew 321 and install batteries in the correct orientation to prepare the unit for initial test and wireless connectivity. Wide temperature-range batteries, such as Energizer® Ultimate Lithium, may be specified to ensure adequate power delivery across an extreme temperature range between at least −40° C. and +60° C.

If desired, indicator LEDs 312 can be configured as desired to communicate device status. For example, indicator LEDs can be configured such that they blink sequentially during initial boot-up until the unit has completed a successful self-test (5-10 seconds). Similarly, the device can be configured such that, following successful boot-up, power LED flash briefly once every few seconds to confirm that adequate power is applied to the shutoff-valve actuator assembly 300. The absence of flashing LEDs therefore can indicate that the batteries need replacing, or that some other failure has occurred. Or, in the event of a fault, an Alarm/Fault light can blink, indicating a device failure or misconfiguration. Additional fault conditions can be viewed on the mobile device 940 (see, e.g., FIG. 12).

The user may be guided through a wizard-based configuration procedure that relies initially on a local peer-to-peer wireless communication link between the shutoff-valve assembly 300 and the mobile device 940. The configuration procedure may also include questions regarding the type of valve (gate or ball), valve size, location of shutoff-valve actuator assembly 300, alarming and notification preferences, Wi-Fi host name and password, as well as other application-specific test processes or learning modes necessary to activate the valve.

Example 12

FIGS. 11-16 show one exemplary, non-limiting embodiment of an end-to-end non-invasive, battery-operated, wireless leak detector and shutoff valve combined assembly 500. When connected together via cable 161, the multi-conductor communication connector 160 on the leak-detector assembly 100 and the multi-conductor communication connector 360 on the shutoff-valve actuator assembly 300 may allow direct communication between both assemblies, and optionally provide redundant battery-power back-up in the event of a low battery on either device.

Example 13

In one non-limiting illustrative embodiment, the user interface in the devices, systems and methods disclosed herein occurs by means of a mobile application such as are commonly used today on smartphones, including, without limitation, iPhones and Android devices. The mobile applications include one or more graphical user interfaces (GUIs) by which the user communicates with the leak-detection communications application. Useful mobile devices see e.g., 940, FIG. 11, typically include a display area, and an input mechanism, such as a touch screen, typically located in the same area as the display area.

Typically, the user accesses the communications application by means of an icon, and access may or may not be password protected. In the event where the user receives an alert, alarm or communication resulting from a leak-detection data anomaly, accessing the alert may serve to open the application directly on the mobile device.

Once in the leak detection communications application, the user can be presented with one or more menu options as are typically displayed in mobile application GUIs. Useful menu options can include, without limitation, options for (1) obtaining more detailed sensor data information; (2) instructing closure of a preconfigured water shut-off valve; (3) communicating with one or more predetermined third parties; (4) checking current water flow status in pipe. Additional menu options such as User Preferences and Settings, can open GUI interfaces that allow user configuration on a host of items including, without limitation, third-party contacts; water-detection device location details; frequency of data sampling; alert settings; and the like.

The flowchart and block diagrams in FIG. 17-20 illustrate the architecture, functionality, and operation of possible implementations of systems, methods and computer program products according to various embodiments of the present disclosure. In this regard, each relevant block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Example 14

Figure 21:
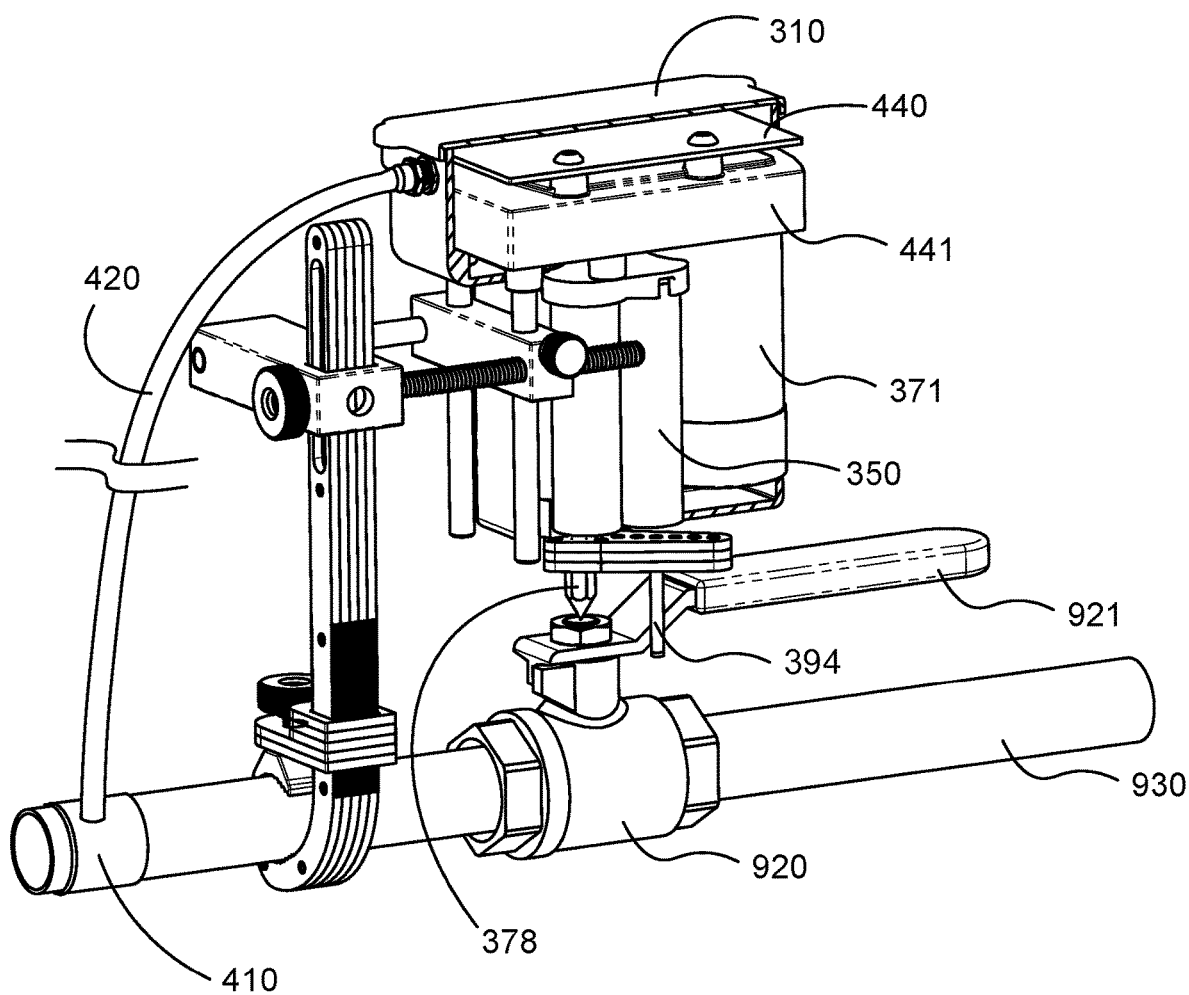
FIG. 21 illustrates one embodiment of a combined leak detector/actuator device of the present disclosure comprising an external piezoelectric acoustic sensor.

FIG. 21 shows an alternative, non-limiting embodiment of a non-invasive, battery-operated wireless leak detector and shutoff valve actuator combined into a single chassis. Key elements of the combined design include an electronics cover 310, a 3V to 24V DC motor 371, a multi-step gearbox 441 to reduce actuator rotational velocity and increase torque, a motor drive shaft 378, and rechargeable lithium batteries 350 in series or series/parallel combination, sufficient to supply the required torque to close and open an existing valve. Printed circuit board 440 includes an embedded microcomputer, wireless communications link (such as WiFi), motor control circuitry, motor current detector, acoustic sensor preamplifier and signal conditioner, A/D converter, ambient-temperature sensor, and battery charging and monitoring circuitry. Upon command to close or open a valve (due, for example, to a leak or manual override), actuator pin 394 rotates an existing ball valve 920 and lever 921 (shown), or gate or globe valve in line with an existing water supply pipe 930.

Example 15

In FIG. 21, sensor 410 comprises an acoustic sensor mechanically associated with the surface of pipe 930. More particularly, sensor 410 can include an acoustic shielded piezoelectric film sensor such as the model SDT1 or similar available from TE Connectivity. Sensor 410 can attach to pipe 930 via an all-weather adhesive or other mechanical means, such as a pipe clamp or hose clamp. The acoustic signal from sensor 410 transmits to the main system via shielded cable 420. Cable 420 can connect directly with board 440 through an opening in housing 440, or be attached thereto by means of a quick connect plug (see e.g., port 360 in FIG. 10). High-impedance input circuitry between 1 Megohm to 10 Megohm, noise reduction, and real-time spectral and time analysis of the acoustic signal can identify water-flow signatures, including persistent flows or leaks. Based on extensive experiments performed on real homes, the acoustic signals of interest range at least between about 100 Hz to less than 10 kHz, and more typically below 5 kHz. Bandpass filtering with appropriate cutoff frequencies can reduce non-essential ambient noise from other sources, such as HVAC systems. By analyzing the spectrum, amplitude, time-envelope and other factors, it is possible to differentiate normal water usage from leaks and/or other unexpected or unusual water flow.

Although this disclosure focuses on water-supply pipes for residential and light-commercial applications, the principles outlined herein can be extended to other media supply lines, including but not limited to other fluids and gases, such as natural gas or propane. Furthermore, although the preferred embodiment is for a non-invasive leak-detector, the same principles and architecture outlined herein can be applied to an inline (invasive) leak detector and/or an inline (invasive) supply shutoff valve.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. An apparatus comprising:
a housing;
a shutoff-valve actuator secured within the housing;
a motor secured within the housing, the motor coupled to the shutoff-valve actuator;
a hardware processor secured within the housing;
a shutoff-valve actuator coupling mechanism to mechanically couple the shutoff-valve actuator to a plurality of different types of handles of a normally manually operated shutoff valve on a pipe, wherein the shutoff-valve actuator coupling mechanism configured to couple to the different types of handles of normally manually operated shutoff valves without modifying or removing the handle of such normally manually operated shutoff valves; and
a clamp mechanism to attach such shutoff-valve actuator to a pipe comprising a single point of attachment to said pipe, wherein the clamp mechanism is designed so that the support for the shutoff-valve actuator is offset from a long axis of the pipe;
wherein the hardware processor is to determine the fully open or fully closed position of a shutoff valve based on load-current sensing information received from the motor, and to cause the shutoff-valve actuator to turn off the motor based on said load-current sensing information.

2. The apparatus of claim 1, wherein the clamp mechanism allows adjustment of the location of the shutoff-valve actuator laterally along the pipe axis relative to the position of the clamp attachment to the pipe.

3. The apparatus of claim 1, the shutoff-valve actuator wherein the clamp mechanism allows adjustment of the perpendicular distance of the shutoff-valve actuator from the pipe center line.

4. The apparatus of claim 1, the shutoff-valve actuator comprising a drive shaft, wherein the shutoff-valve actuator coupling mechanism comprises a receiver coupled to the drive shaft to receive interchangeable adapters attached to the drive shaft, such interchangeable adapters designed to couple the drive shaft to normally manually operated ball, gate, or globe shutoff-valves.

5. The apparatus of claim 1, further comprising a fluid flow detection device, the hardware processor connected to the fluid flow detection device, the hardware processor to determine unexpected fluid flow and control the shutoff-valve actuator to close valve in the event of a leak based on information received from the fluid flow detection device.

6. The apparatus of claim 5, wherein the fluid flow detection device comprises an acoustic sensor.

7. The apparatus of claim 1, further comprising a battery holder housed in the housing; the motor and hardware processor electrically coupled to the battery in the battery holder.

8. The apparatus of claim 1, wherein said hardware processor is wirelessly connected to the internet, and is capable of receiving and acting on commands received via the internet to open or close the valve.

9. The apparatus of claim 1, wherein the clamp mechanism comprises a clamp.

10. An apparatus comprising:
a housing comprising:
an acoustic fluid-flow detection device, and
a shutoff-valve actuator;
a shutoff-valve actuator coupling mechanism to mechanically couple the shutoff-valve actuator to a plurality of different types of manually operated shutoff valve on a pipe, the shutoff-valve actuator coupling mechanism configured to couple to the different types of handles of manually operated shutoff valves without modifying or removing the handle of such manually operated shutoff valves;
a clamp mechanism to attach such shutoff-valve actuator to a pipe comprising a single point of attachment to said pipe, wherein the clamp mechanism is designed so that the support for the shutoff-valve actuator is offset from a long axis of the pipe.

11. The apparatus of claim 10, the shutoff-valve actuator wherein the clamp mechanism allows adjustment of the location of the shutoff-valve actuator laterally along the pipe axis relative to the position of the clamp attachment to the pipe.

12. The apparatus of claim 10, the shutoff-valve actuator wherein the clamp mechanism allows adjustment of the perpendicular distance of the shutoff-valve actuator from the pipe center line.

13. The apparatus of claim 10, the shutoff-valve actuator comprising a drive shaft, wherein the shutoff-valve actuator coupling mechanism comprises a receiver coupled to the drive shaft to receive interchangeable adapters attached to the drive shaft, such interchangeable adapters designed to couple the drive shaft to normally manually operated ball, gate, or globe shutoff-valves.

14. The apparatus of claim 10, further comprising a hardware processor housed in the housing wherein the hardware processor is connected to the acoustic fluid-low detection device, and based on information received from said acoustic fluid-flow detection device, the hardware processor is to determine unexpected fluid flow and independently control the shutoff-valve actuator.

15. The apparatus of claim 14, wherein the hardware processor is to determine the fully open or fully closed position of a shutoff valve based on load-current sensing information received from the motor, and to cause the shutoff-valve actuator to turn off the motor based on said load-current sensing information.

16. The apparatus of claim 14, wherein the hardware processor is wirelessly connected to the internet, and is capable of receiving and acting on commands received via the internet to open or close a shutoff valve.

17. The apparatus of claim 14, further comprising a battery holder, housed in the housing; the shut-off valve actuator, acoustic fluid flow detection device and hardware processor electrically coupled to the battery in the battery holder.

18. An apparatus comprising:
a shutoff-valve actuator comprising a drive shaft;
wherein the drive shaft comprises a receiver to mate with a shut-off valve actuator coupling mechanism, the coupling mechanism to mechanically couple the shut-off-valve actuator to a plurality of different types of handles of manually operated shutoff valves, the shut-off-valve actuator coupling configured to couple to the different types of handles of manually operated shutoff valves without modifying or removing the handle of such manually operated shutoff valves; and
a clamp mechanism to attach such shutoff-valve actuator to a pipe comprising a single point of attachment to said pipe, wherein the clamp mechanism is designed so that the support for the shutoff-valve actuator is offset from a long axis of the pipe.

19. The apparatus of claim 18, the shutoff-valve actuator wherein the clamp mechanism allows adjustment of the location of the motor drive shaft laterally along the pipe axis relative to the position of the clamp attachment to the pipe.

20. The apparatus of claim 18, the shutoff-valve actuator wherein the clamp mechanism allows adjustment of the perpendicular distance of the motor drive shaft from the pipe center line.

21. The apparatus of claim 18, wherein the shutoff-valve actuator coupling mechanism comprises interchangeable adapters attached to the motor drive shaft, such interchangeable adapters designed to couple the motor drive shaft to normally manually operated ball, gate, or globe shutoff-valves.

22. The apparatus of claim 18, further comprising:
a housing;
a motor and associated drive shaft;
a hardware processor;
wherein the motor and the hardware processor are secured within the housing.

23. The apparatus of claim 22, wherein the hardware processor is to determine the fully open or fully closed position of a shutoff valve based on load-current sensing information received from the motor, and to cause the shutoff-valve actuator to turn off the motor based on said load-current sensing information.

24. The apparatus of claim 22, wherein said hardware processor is connected to a fluid flow detection device, and based on information received from said fluid flow detection device is competent to determine unexpected fluid flow and independently control shutoff-valve actuator to close valve in the event of a leak.

25. The apparatus of claim 22, wherein said hardware processor is wirelessly connected to the internet, and is capable of receiving and acting on commands received via the internet to open or close the valve.

26. The apparatus of claim 22, further comprising a battery holder, housed in the housing; the motor and hardware processor electrically coupled to the battery in the battery holder.

27. An apparatus comprising:
a housing;
a fluid flow sensor secured within the housing;
a hardware processor secured within the housing;
a shutoff-valve actuator secured within the housing, the shutoff-valve actuator comprising a motor and a drive shaft coupled to the motor;
wherein the drive shaft comprises a receiver to mate with interchangeable adapters attached to the drive shaft, the interchangeable adapters designed to couple the drive shaft to normally manually operated ball, gate or globe shutoff-valves;
a clamp mechanism to attach such shutoff-valve actuator to a pipe comprising a single point of attachment to said pipe, wherein the clamp mechanism is designed so that the support for the shutoff-valve actuator is offset from a long axis of the pipe;
wherein the hardware processor is to determine the fully open or fully closed position of a shutoff valve based on load-current sensing information received from the motor, and to cause the shutoff-valve actuator to turn off the motor based on said load-current sensing information.

28. The apparatus of claim 27, the shutoff-valve actuator wherein the clamp mechanism allows adjustment of the location of the motor drive shaft laterally along the pipe axis relative to the position of the clamp attachment to the pipe.

29. The apparatus of claim 27, the shutoff-valve actuator wherein the clamp mechanism allows adjustment of the perpendicular distance of the motor drive shaft from the pipe center line.

30. The apparatus of claim 27, wherein the clamp mechanism comprises a J-clamp.

31. The apparatus of claim 27, wherein the hardware processor analyzes signals from the fluid flow sensor and is competent to determine unexpected fluid flow and independently control shutoff-valve actuator to close valve in the event of a leak.

32. The apparatus of claim 27, wherein the hardware processor is wirelessly connected to the internet, and is configured to receive and execute commands received via the internet to open or close the valve.

33. The apparatus of claim 27, further comprising a battery holder, housed in the housing; the fluid flow sensor, motor-drive shut-off valve actuator and hardware processor electrically coupled to the battery in the battery holder.

* * * * *